(12) United States Patent
Noh et al.

(10) Patent No.: US 11,855,309 B2
(45) Date of Patent: Dec. 26, 2023

(54) INTERCONNECT FOR A SOLID OXIDE FUEL CELL, ITS MANUFACTURING METHOD, AND A SOLID OXIDE FUEL CELL

(71) Applicant: LG CHEM, LTD., Seoul (KR)

(72) Inventors: Tai Min Noh, Daejeon (KR); Daehwan Kim, Daejeon (KR); Chanyeup Chung, Daejeon (KR); Sanghyun Park, Daejeon (KR); Changseok Ryoo, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 313 days.

(21) Appl. No.: 16/641,093

(22) PCT Filed: Sep. 6, 2018

(86) PCT No.: PCT/KR2018/010433
§ 371 (c)(1),
(2) Date: Feb. 21, 2020

(87) PCT Pub. No.: WO2019/050301
PCT Pub. Date: Mar. 14, 2019

(65) Prior Publication Data
US 2020/0194807 A1 Jun. 18, 2020

(30) Foreign Application Priority Data
Sep. 8, 2017 (KR) .................. 10-2017-0115336

(51) Int. Cl.
*H01M 8/12* (2016.01)
*H01M 8/0228* (2016.01)
(Continued)

(52) U.S. Cl.
CPC ............ *H01M 8/0228* (2013.01); *C25D 5/50* (2013.01); *H01M 8/0217* (2013.01); *H01M 2008/1293* (2013.01)

(58) Field of Classification Search
CPC ............ H01M 8/0228; H01M 8/0217; H01M 2008/1293; H01M 8/021; H01M 8/0215;
(Continued)

(56) References Cited

U.S. PATENT DOCUMENTS

| | | | |
|---|---|---|---|
| 4,115,238 A * | 9/1978 | Cipris | H01M 4/86 204/290.01 |
| 5,942,349 A | 8/1999 | Badwal et al. | |

(Continued)

FOREIGN PATENT DOCUMENTS

| | | |
|---|---|---|
| AU | 4931596 A | 10/1996 |
| CN | 101519740 A | 9/2009 |

(Continued)

OTHER PUBLICATIONS

Cheng et al., "Performance of Co—Ni—O spinel oxide coating on AISI 430 stainless steel as interconnect for intermediate temperature solid oxide fuel cell", International Journal of Hydrogen Energy, Apr. 21, 2017, vol. 42, No. 17, pp. 12477-12484.

(Continued)

*Primary Examiner* — Christian Roldan
(74) *Attorney, Agent, or Firm* — Birch, Stewart, Kolasch & Birch, LLP

(57) ABSTRACT

An interconnect for a solid oxide fuel cell, its manufacturing method, and a solid oxide fuel cell including the same are provided.

12 Claims, 13 Drawing Sheets

(51) Int. Cl.
*C25D 5/50* (2006.01)
*H01M 8/0217* (2016.01)

(58) Field of Classification Search
CPC .. H01M 8/12; C25D 5/50; C25D 9/04; C25D 3/562; Y02E 60/50; Y02P 70/50
USPC ....................................................... 429/465
See application file for complete search history.

(56) References Cited

U.S. PATENT DOCUMENTS

| | | | |
|---|---|---|---|
| 8,865,373 B2 | 10/2014 | Inoue et al. | |
| 2002/0081762 A1* | 6/2002 | Jacobson | H01M 4/0419 438/32 |
| 2003/0098772 A1* | 5/2003 | Tseung | G01N 27/12 338/32 H |
| 2006/0099442 A1* | 5/2006 | Tietz | H01M 8/0208 427/372.2 |
| 2010/0015473 A1* | 1/2010 | Hendriksen | H01M 8/2425 429/149 |
| 2011/0287341 A1* | 11/2011 | Inoue | H01M 8/1231 429/532 |
| 2013/0129557 A1 | 5/2013 | Herchen et al. | |
| 2014/0050971 A1* | 2/2014 | Tomomori | H01M 10/28 429/176 |
| 2014/0113213 A1* | 4/2014 | Wei | H01M 4/881 429/482 |
| 2017/0203972 A1* | 7/2017 | Schwartz | B29C 39/003 |
| 2019/0224650 A1* | 7/2019 | Park | B01J 21/18 |

FOREIGN PATENT DOCUMENTS

| | | |
|---|---|---|
| CN | 104269569 A | 1/2015 |
| CN | 104393315 A | 3/2015 |
| CN | 106587938 A | 4/2017 |
| JP | 4659136 B2 | 3/2011 |
| JP | 2012-119126 A | 6/2012 |
| JP | 2013-118178 A | 6/2013 |
| JP | 2013-179039 A | 9/2013 |
| KR | 10-0803085 B1 | 2/2008 |
| KR | 10-2011-0020781 A | 3/2011 |
| KR | 10-2012-0075258 A | 7/2012 |
| KR | 10-2015-0076300 A | 7/2015 |
| KR | 10-2016-0143911 A | 12/2016 |
| WO | WO 2011/048307 A1 | 4/2011 |
| WO | WO 2015/005570 A1 | 1/2015 |

OTHER PUBLICATIONS

Hua et al., "A promising $NiCo_2O_4$ protective coating for metallic interconnects of solid oxide fuel cells", Journal of Power Sources, 2010, vol. 195, No. 21, pp. 7375-7379.
International Search Report (PCT/ISA/210) issued in PCT/KR2018/010433, dated Jan. 10, 2019.
Jalilvand et al., "Fe doped Ni—Co spinel protective coating on ferritic stainless steel for SOFC interconnect application", International Journal of Hydrogen Energy, 2013, vol. 38, No. 27, pp. 12007-12014.
Written Opinion (PCT/ISA/237) issued in PCT/KR2018/010433, dated Jan. 10, 2019.

* cited by examiner

[Fig. 1]
[Fig. 2]
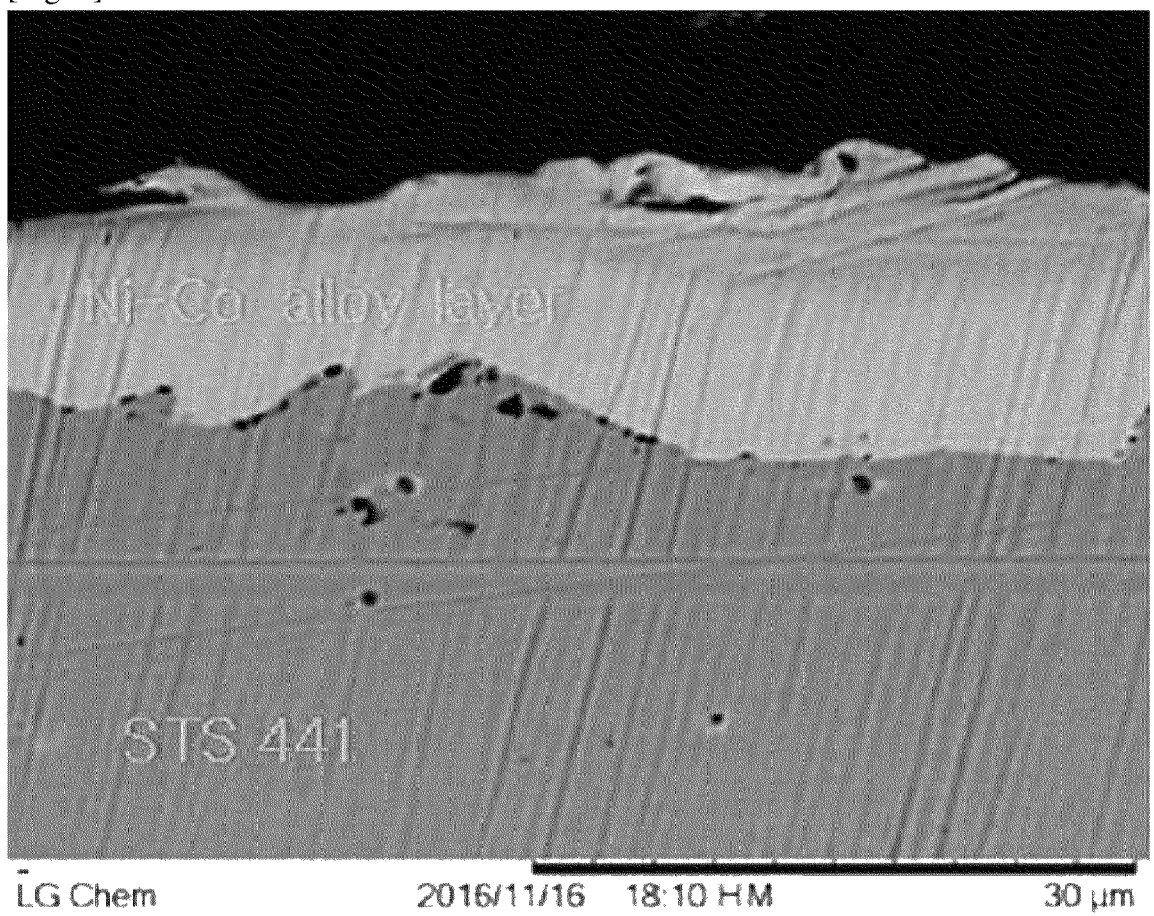

[Fig. 3]
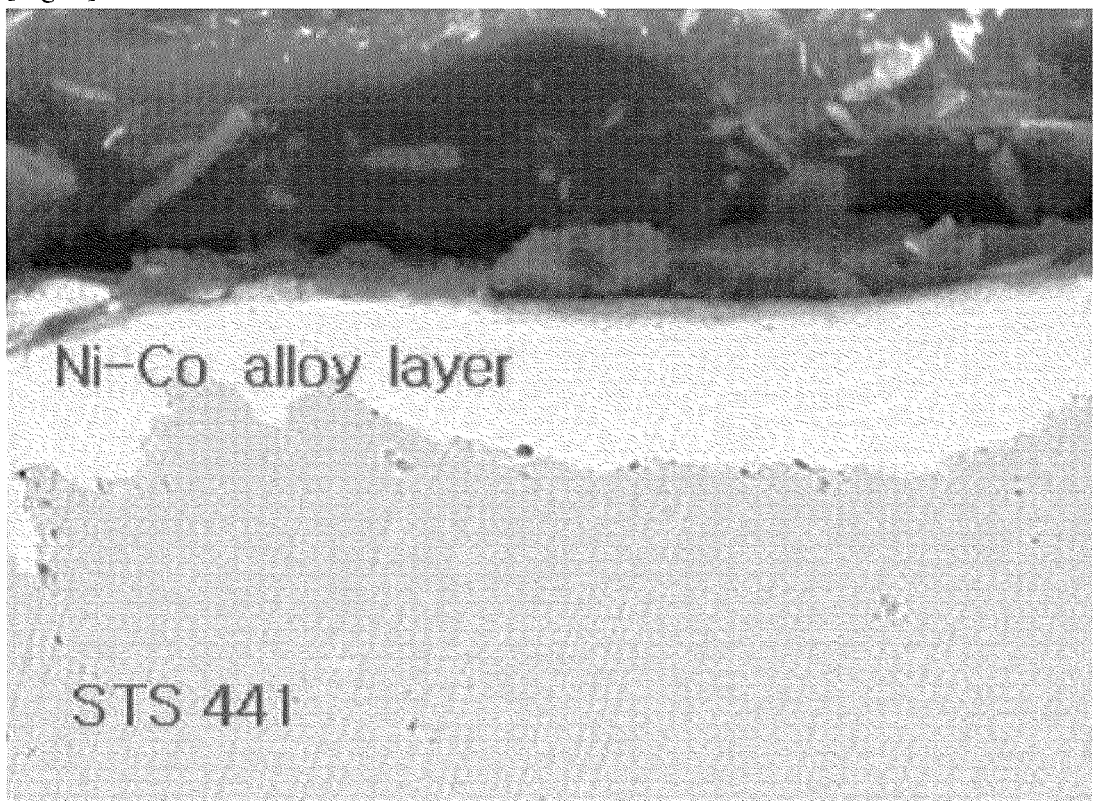
[Fig. 4]
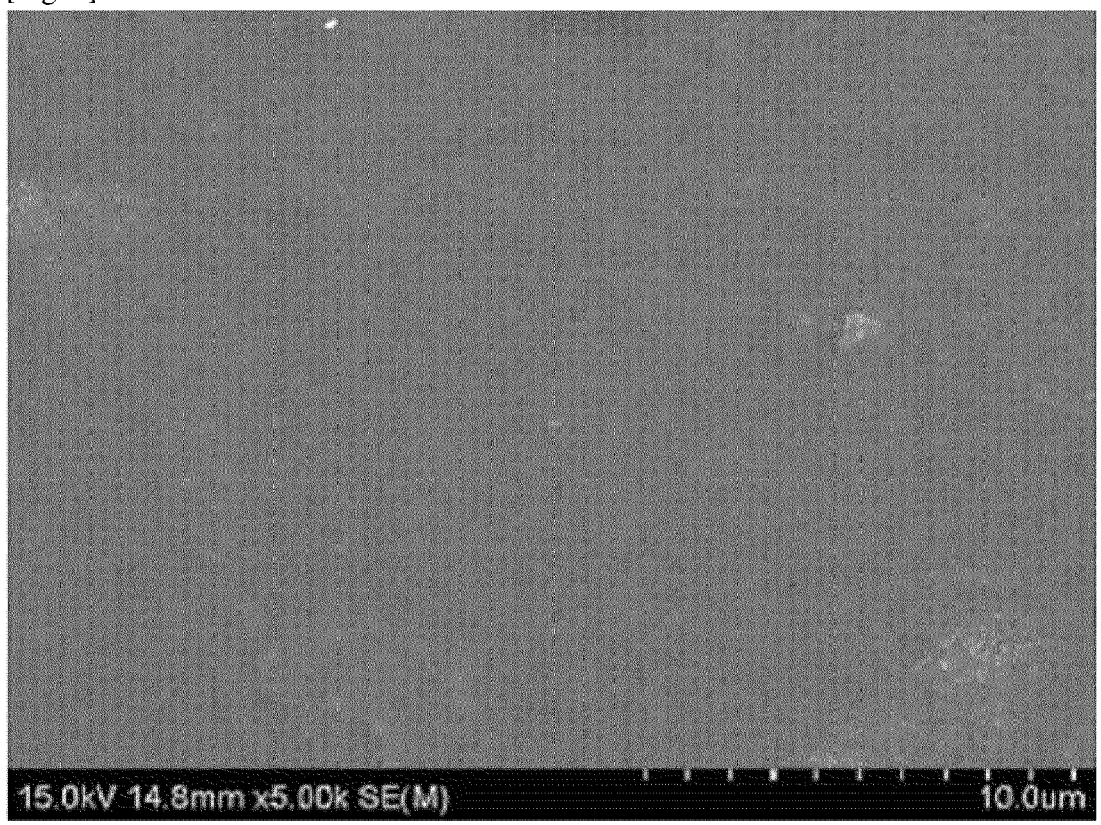

[Fig. 5]
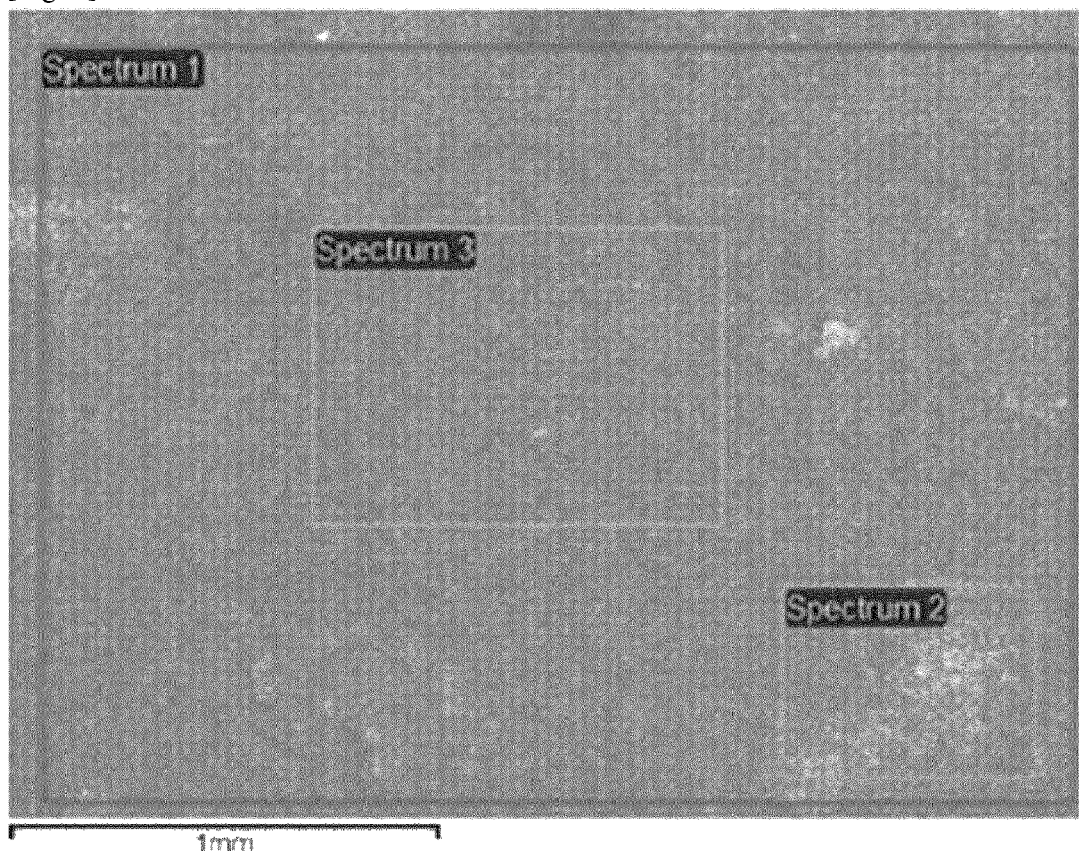
[Fig. 6]
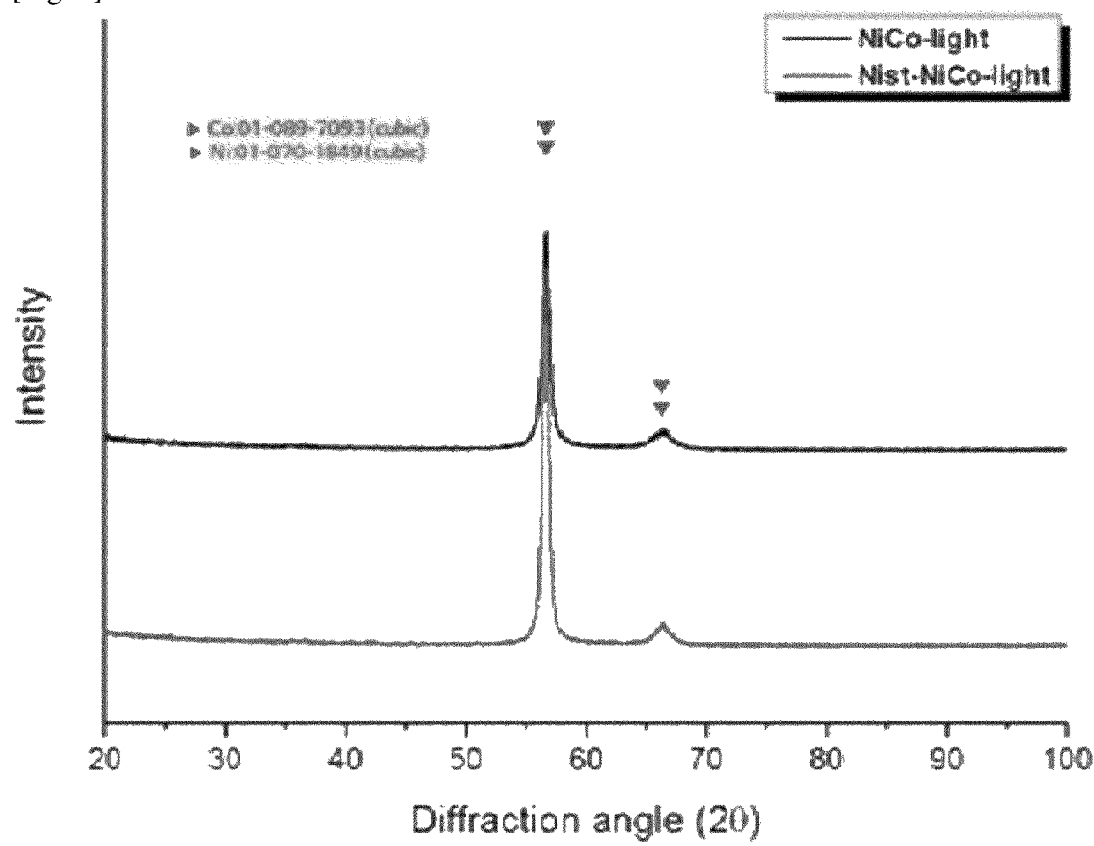

[Fig. 7]
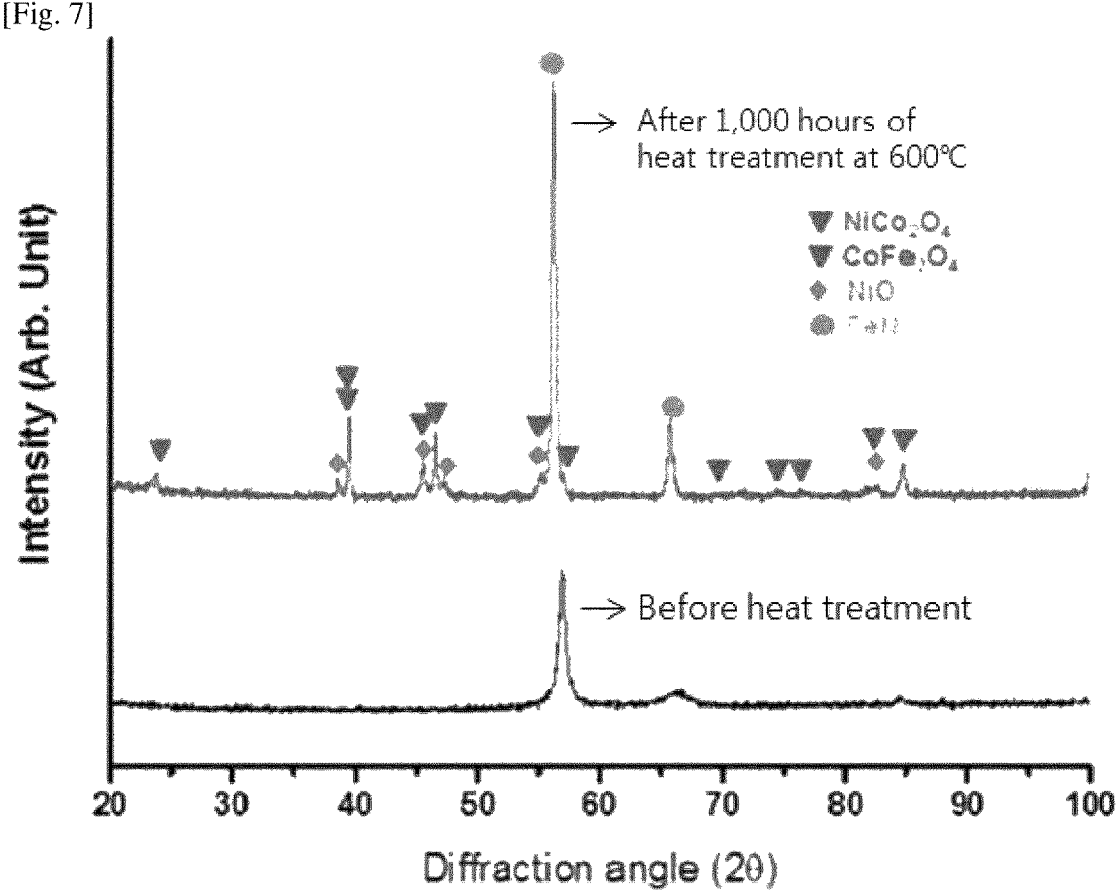
[Fig. 8]
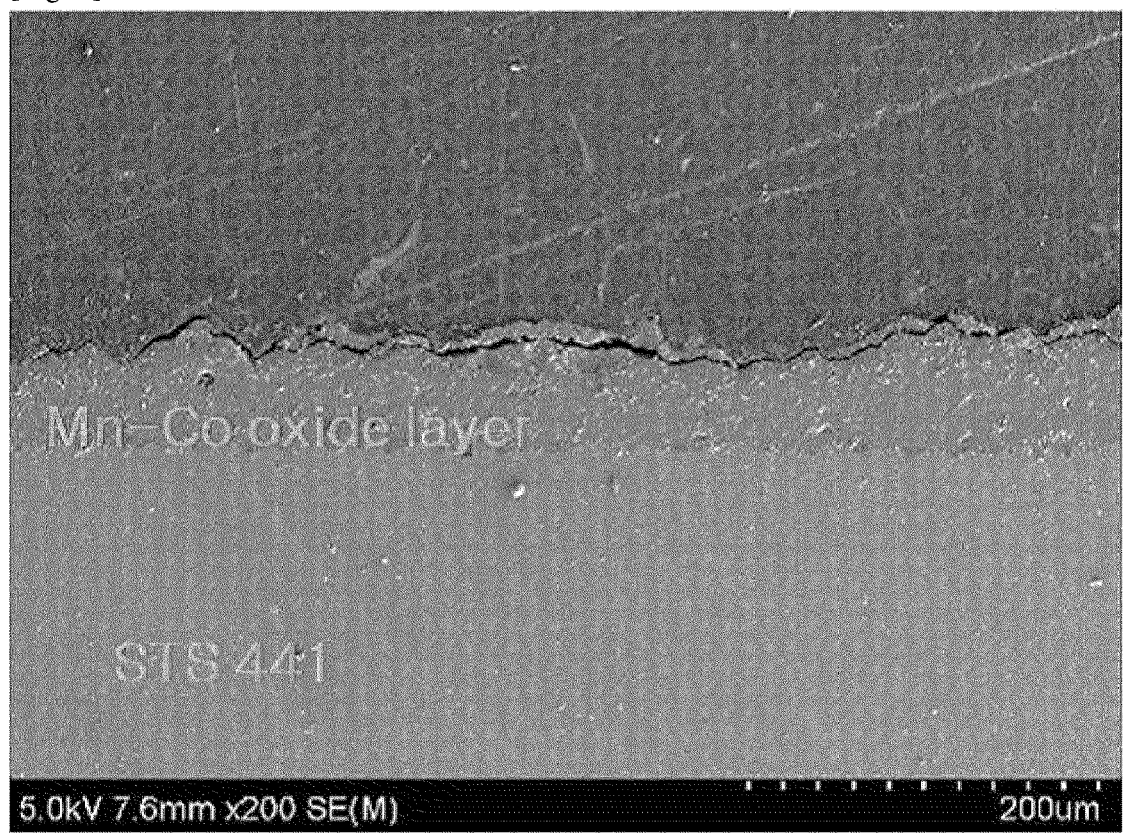

[Fig. 9]
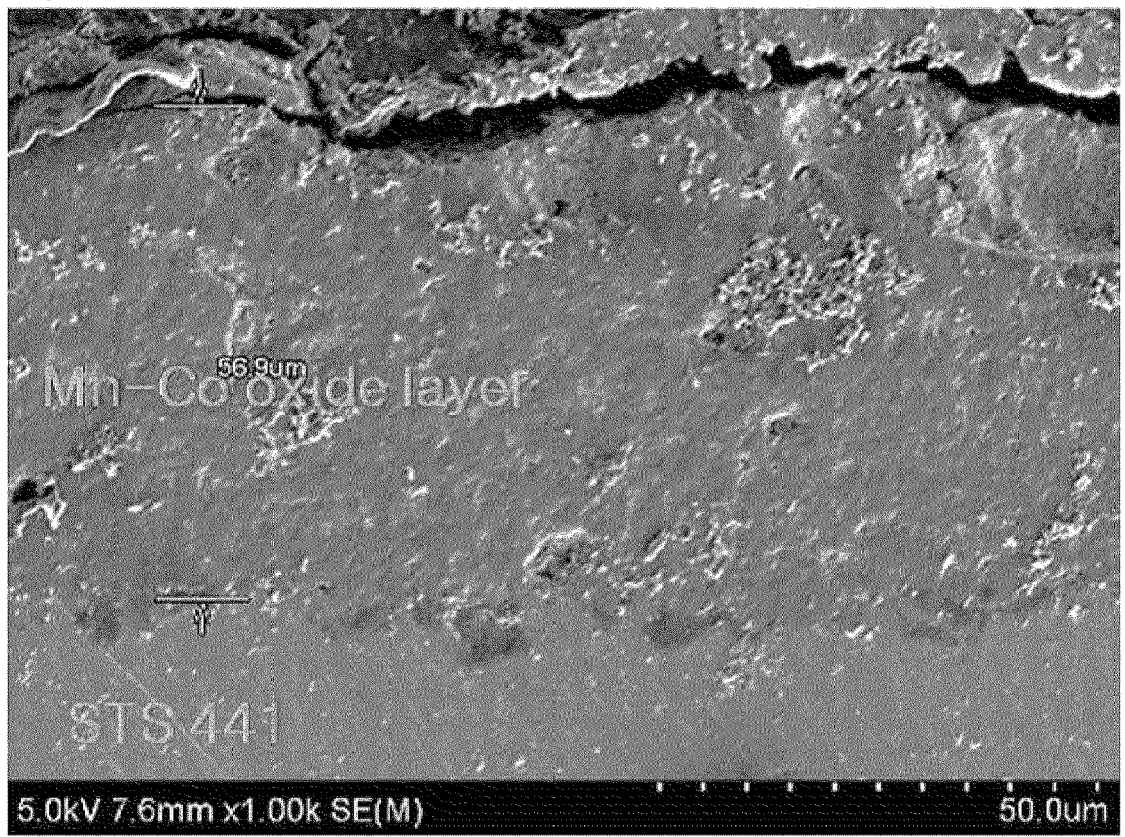
[Fig. 10]
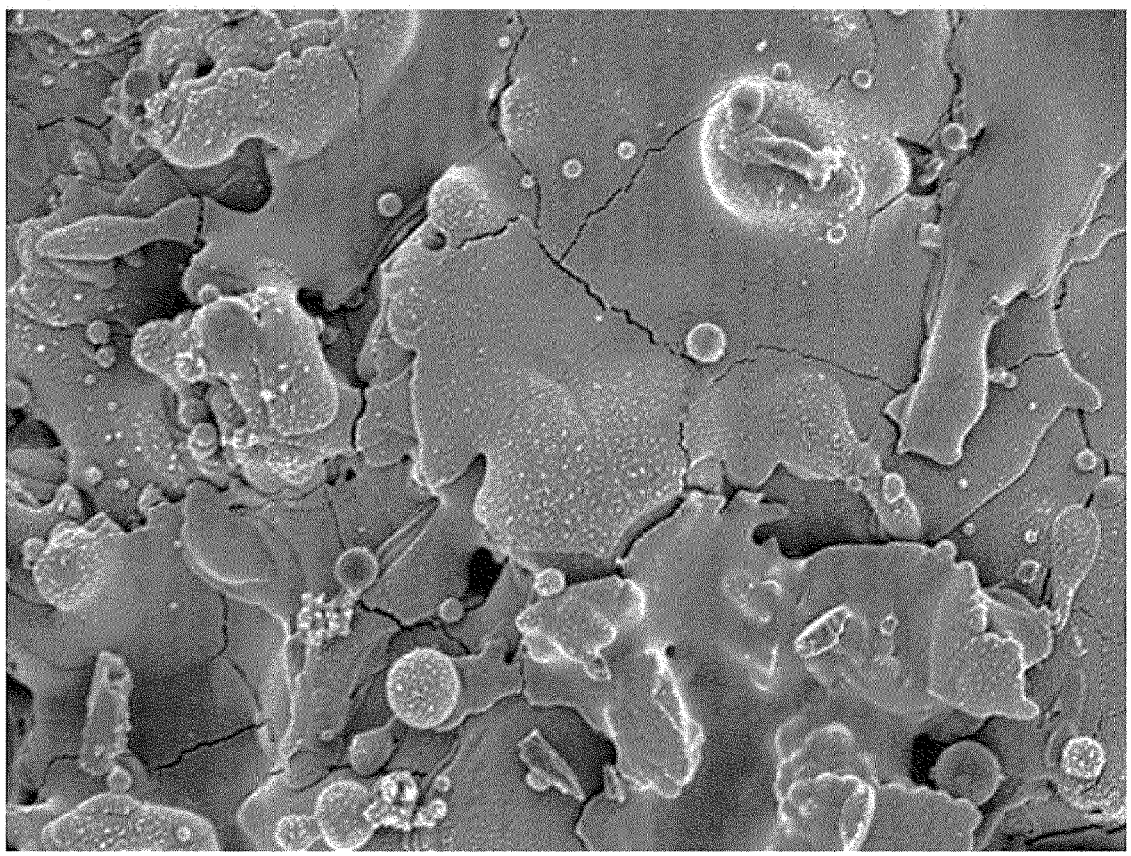

[Fig. 11]
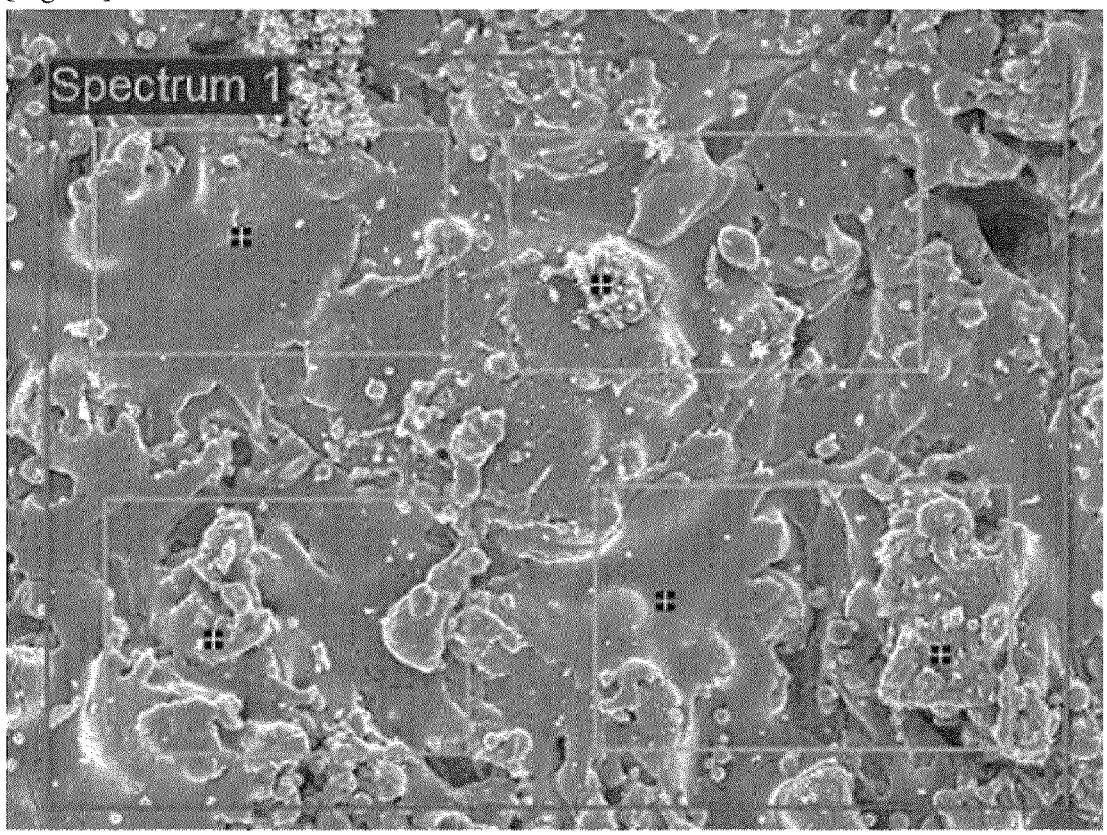
[Fig. 12]
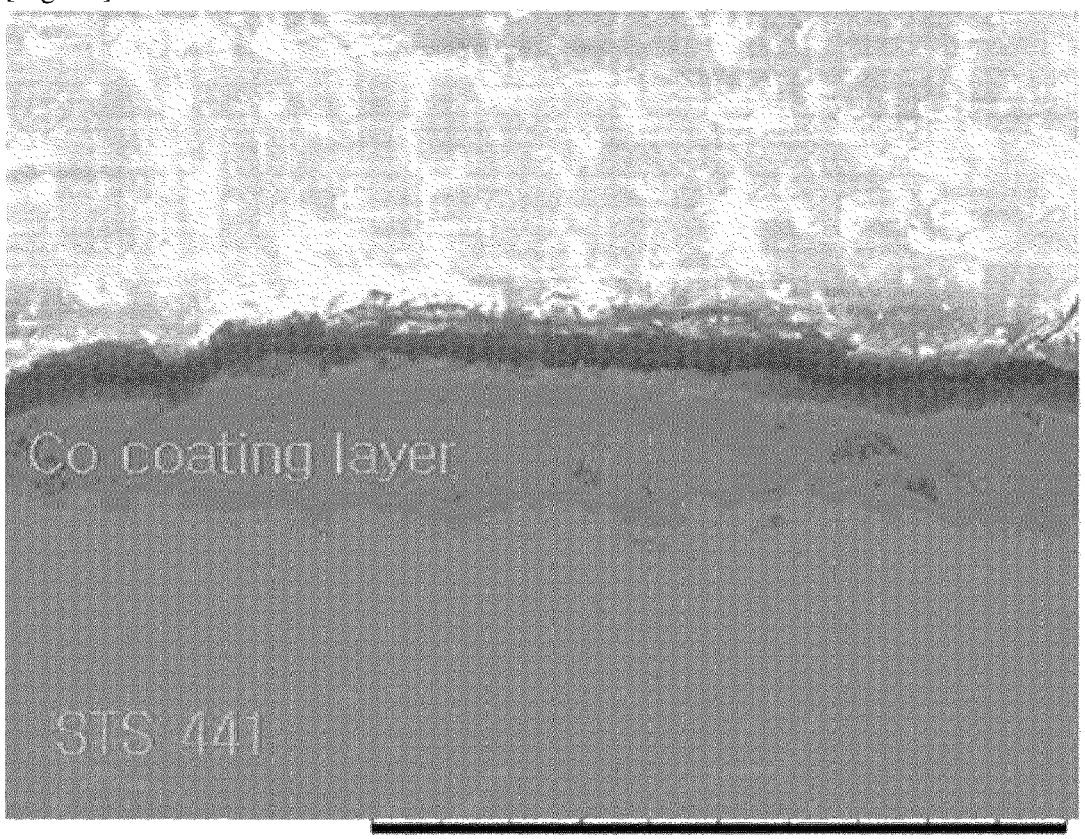

[Fig. 13]
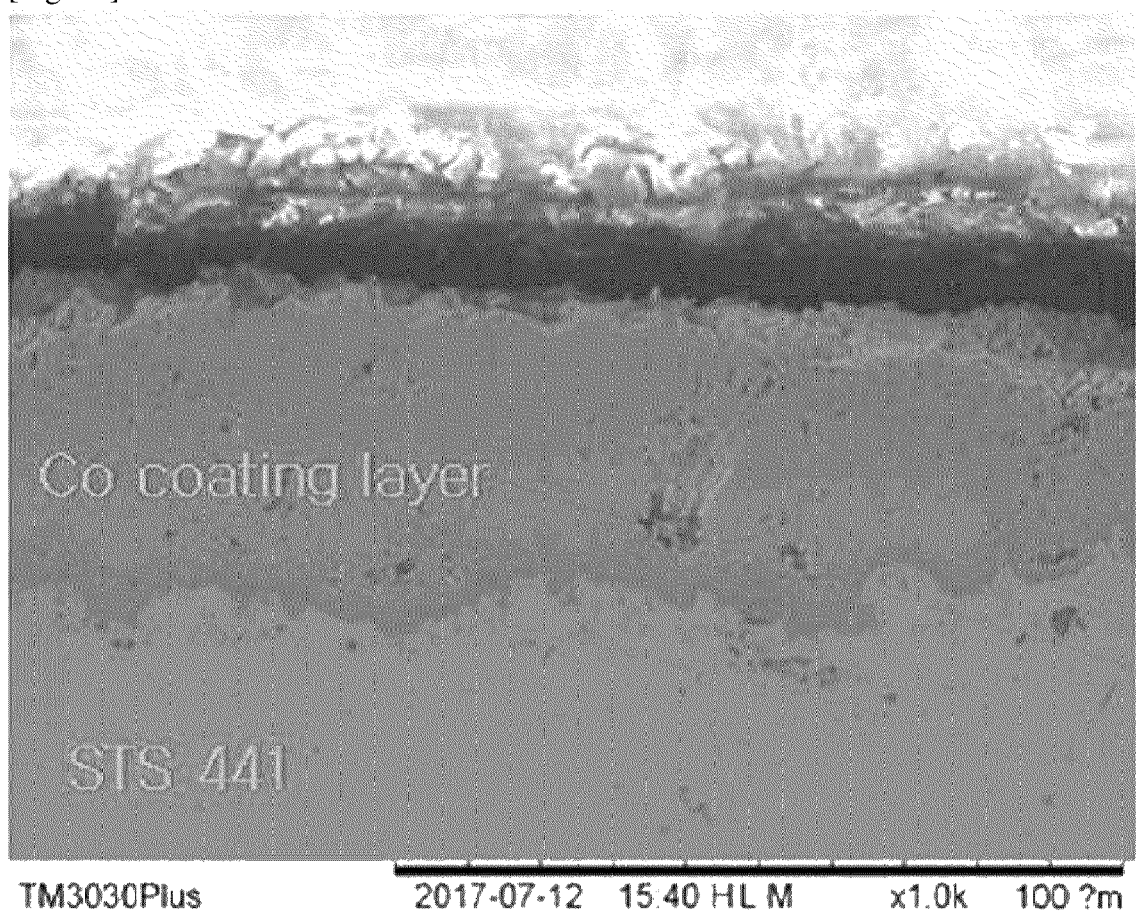

[Fig. 14]
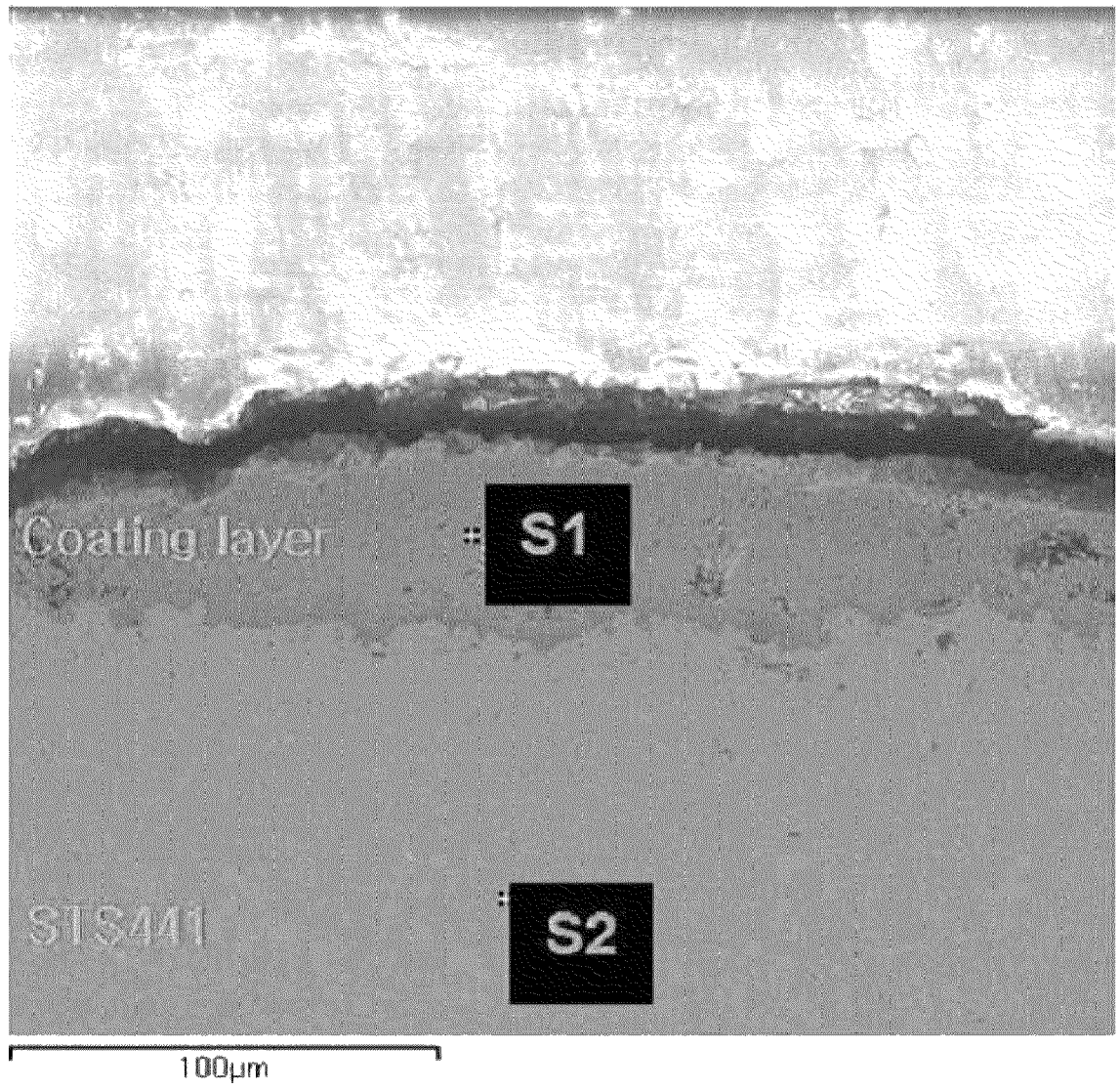

[Fig. 15]
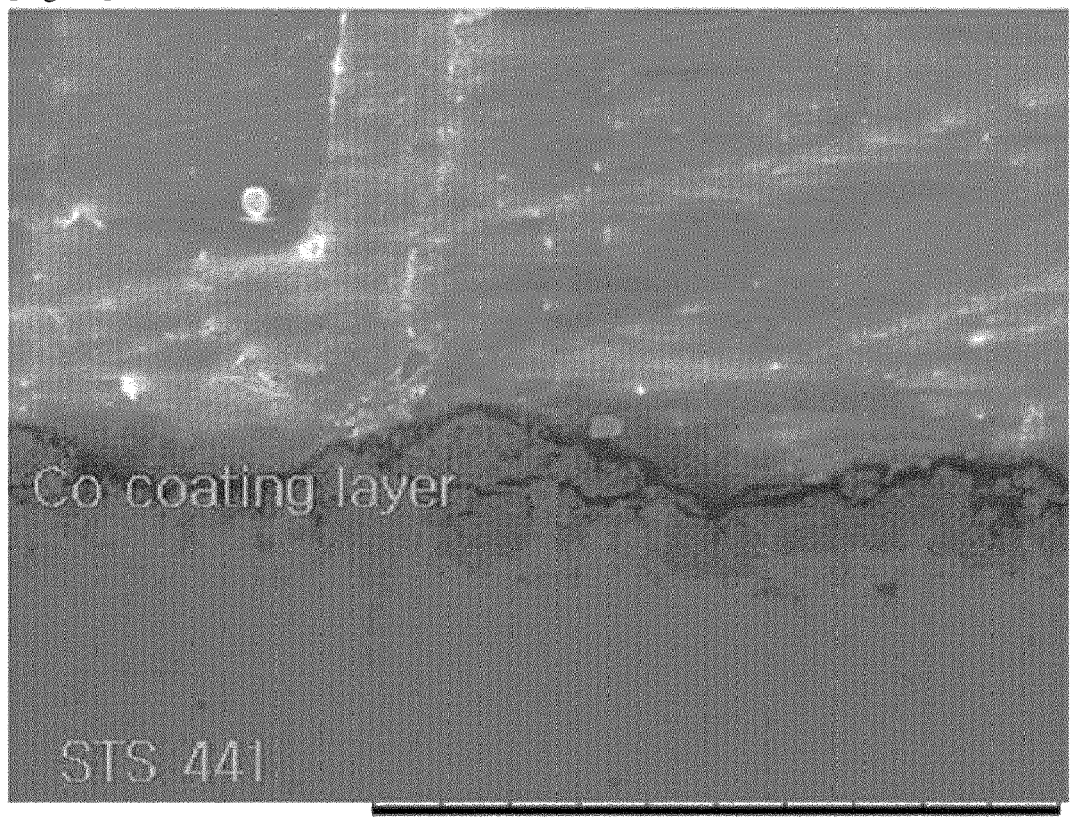
[Fig. 16]
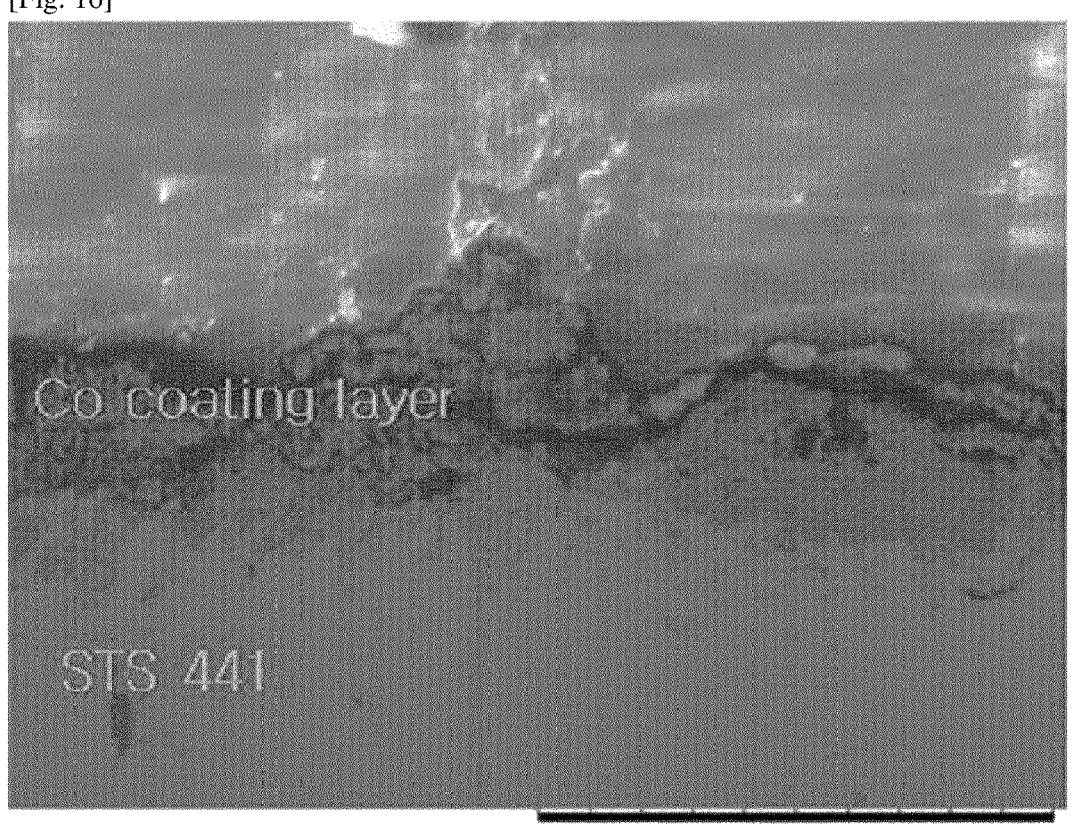

[Fig. 17]
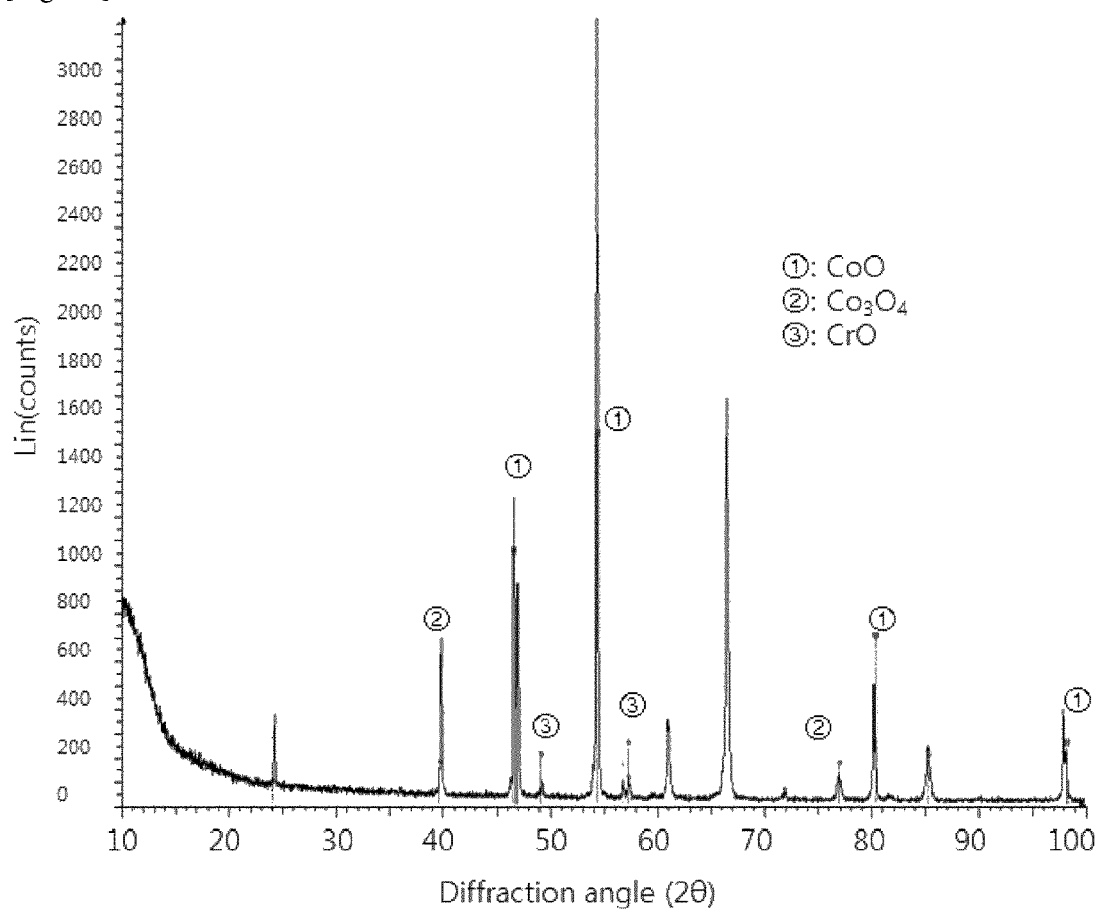
[Fig. 18]
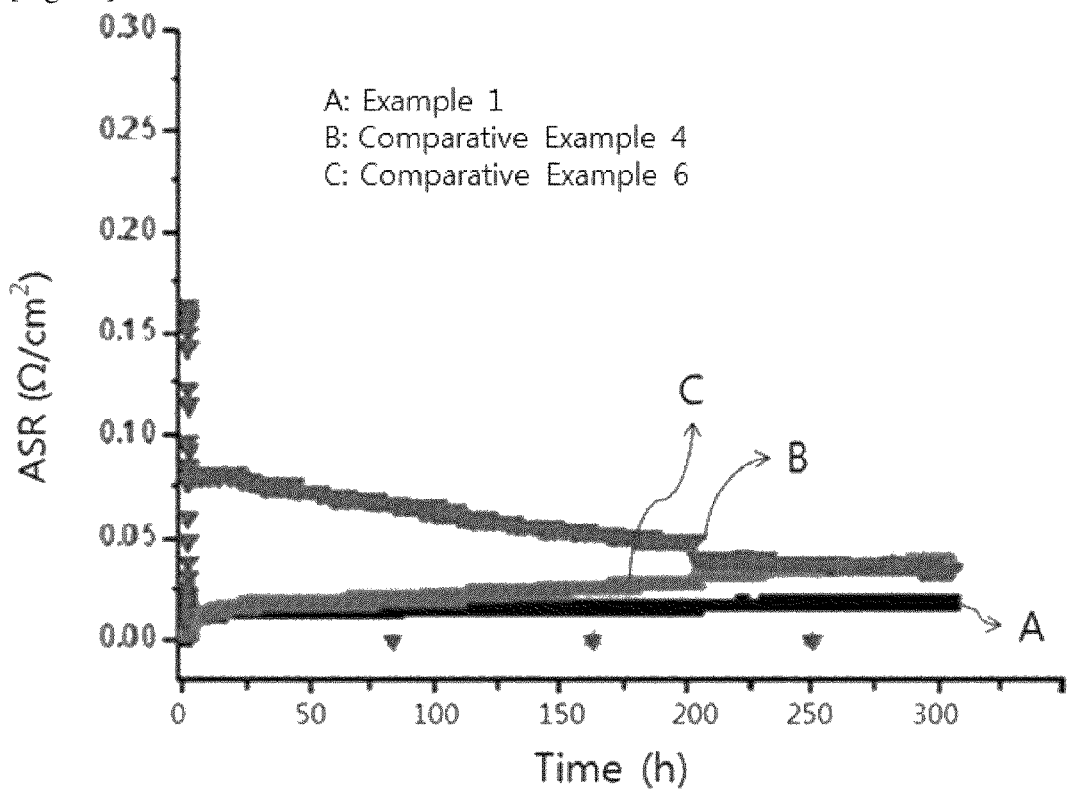

[Fig. 19]
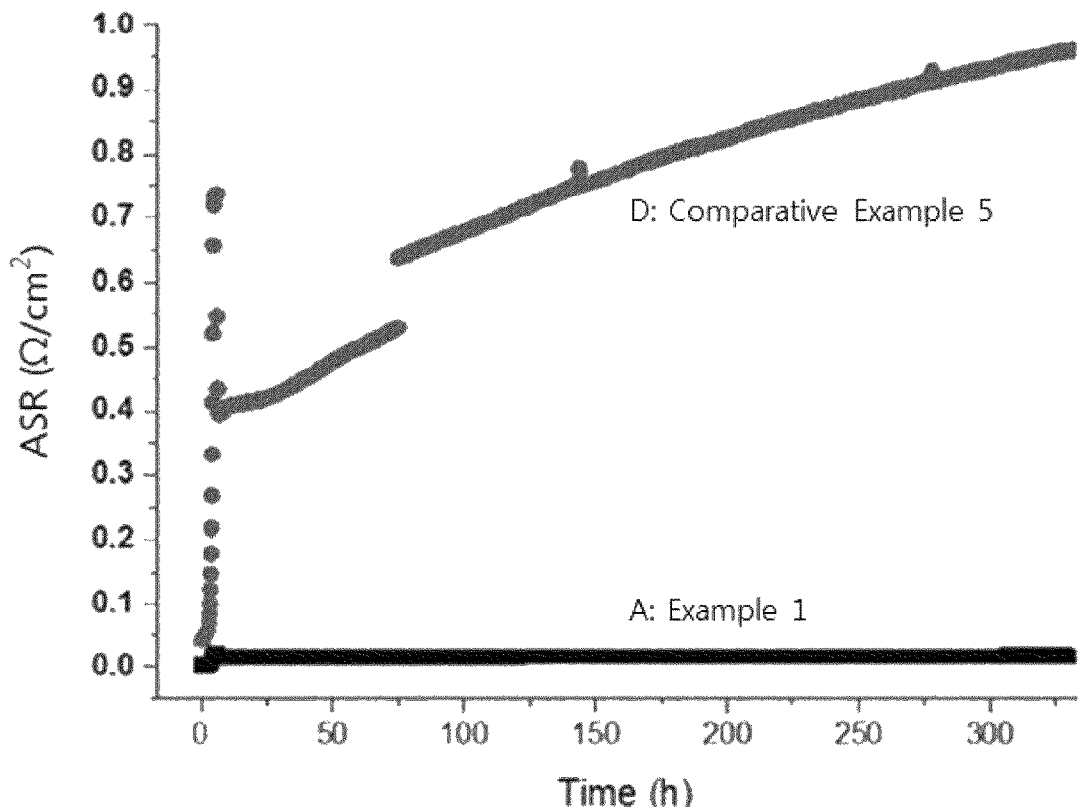
[Fig. 20]
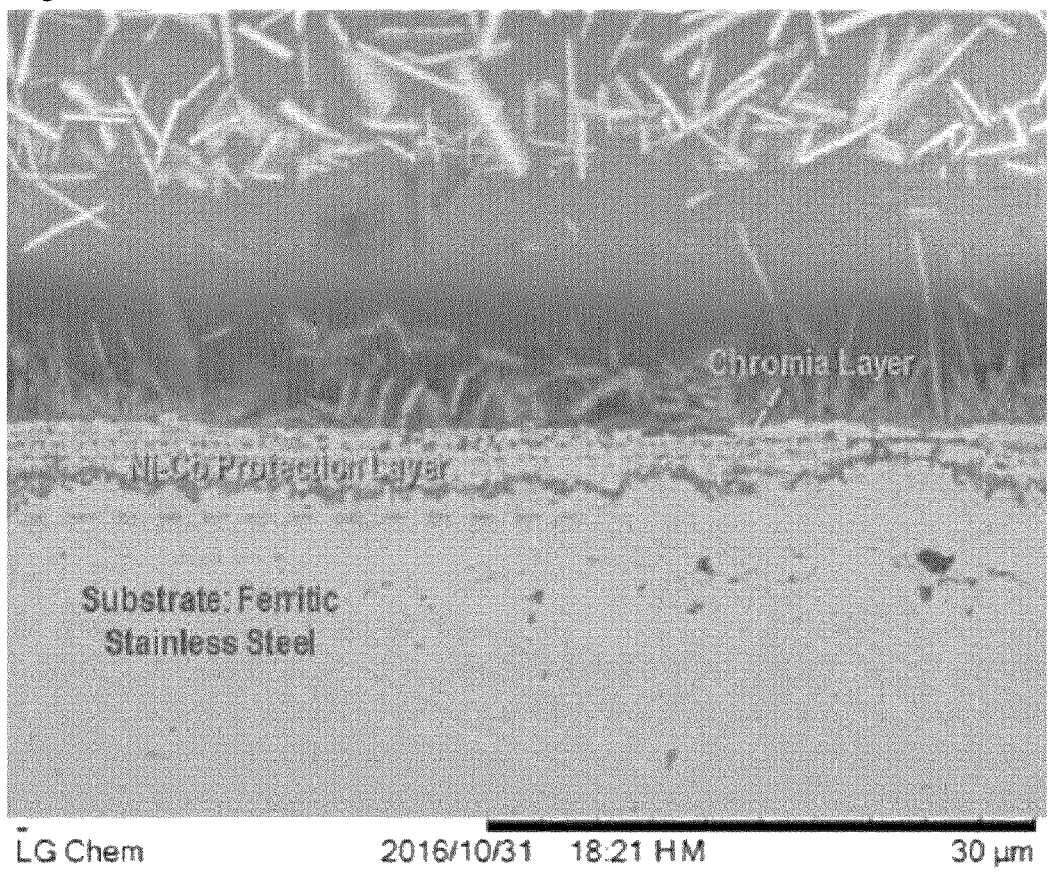

[Fig. 21]
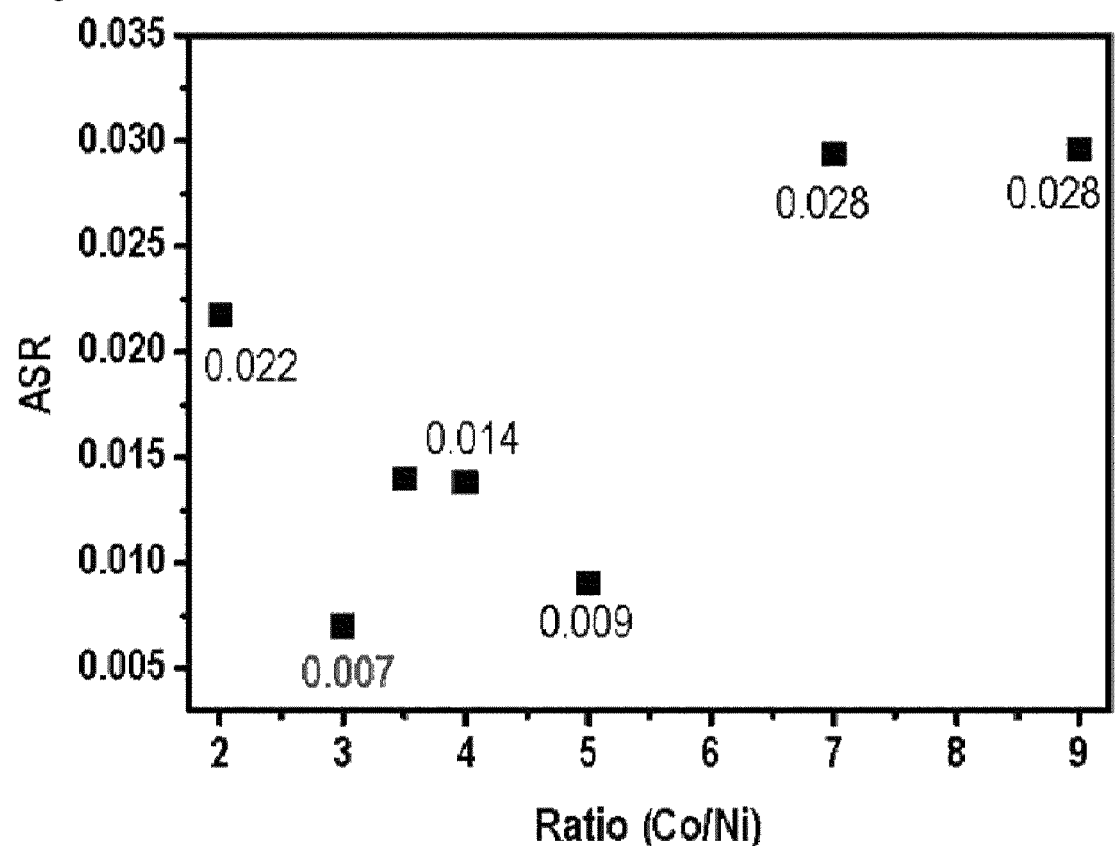

[Figure 22]
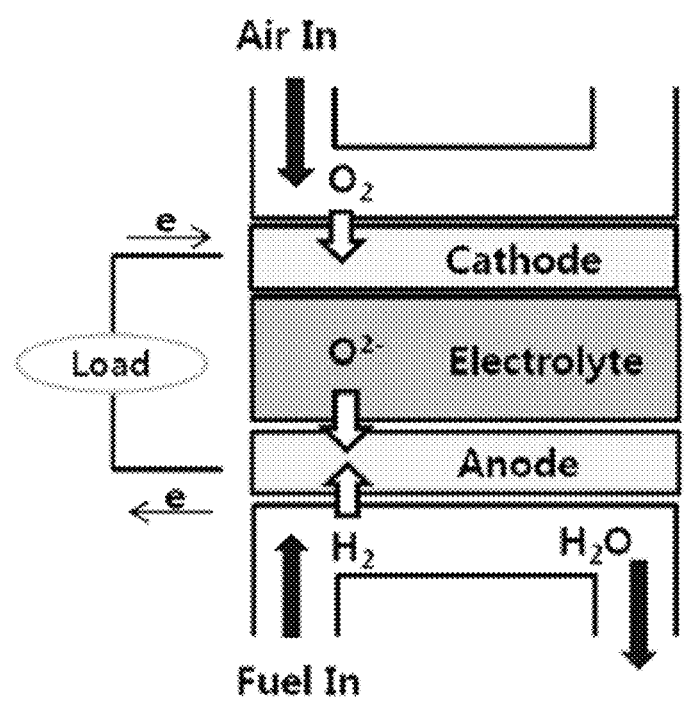

INTERCONNECT FOR A SOLID OXIDE FUEL CELL, ITS MANUFACTURING METHOD, AND A SOLID OXIDE FUEL CELL

TECHNICAL FIELD

This application claims priority to and the benefits of Korean Patent Application No. 10-2017-0115336, filed with the Korean Intellectual Property Office on Sep. 8, 2017, the entire contents of which are incorporated herein by reference.

The present specification relates to an interconnect for a solid oxide fuel cell, a method for manufacturing an interconnect for a solid oxide fuel cell, which is intended to maintain excellent electrical properties at high temperatures, and a solid oxide fuel cell comprising the interconnect for the solid oxide fuel cell.

BACKGROUND ART

In recent years, as the exhaustion of existing energy resources such as oil and coal has been predicted, interest in energy that can be used as an alternative to them has increased. As one of these alternative energies, fuel cells are attracting particular attention because they are highly efficient, do not emit pollutants such as NOx and SOx, and use an abundant fuel.

Fuel cells are power-generating systems that covert the energy produced by a chemical reaction between a fuel and an oxidant into electrical energy. As the fuel, hydrogen or a hydrocarbon such as methanol, butane or the like is typically used, and as the oxidant, oxygen is typically used.

Fuel cells comprise polymer electrolyte membrane fuel cells (PEMFCs), direct methanol fuel cells (DMFCs), phosphoric acid fuel cells (PAFCs), alkaline fuel cells (AFCs), molten carbonate fuel cells (MCFCs), solid oxide fuel cells (SOFCs), and the like.

FIG. 22 schematically illustrates the principle by which a solid oxide fuel cell generates electricity. As shown therein, the solid oxide fuel cell comprises an electrolyte and an anode (fuel electrode) and a cathode (air electrode) formed on both sides of the electrolyte. Referring to FIG. 22 that illustrates the principle by which the solid oxide fuel cell generates electricity, oxygen ions are produced at the cathode while air is electrochemically reduced, and the produced oxygen ions are transferred to the anode through the electrolyte. A fuel, such as hydrogen, methanol, butane or the like, is injected into the anode, and the fuel combines with the oxygen ions and electro-chemically oxidized by the oxygen ions to give out electrons and produce water. The electrons generated by this reaction move to an external circuit.

An interconnect is the key component of solid oxide fuel cells (SOFCs) that serves to electrically connect unit cells and separate fuel from air.

The interconnect has advantages in that it is suitable as a support due to its very high mechanical strength and can reduce the resistance of SOFC cells and stacks due to its high electrical conductivity.

However, when the SOFC is operated for a long period of time, problems arise in that the interfacial resistance of the metallic interconnect increases due to the continuous growth of a chromium-containing interfacial oxide and in that chromium evaporated from the chromium oxide layer is accumulated on the cathode and reduces the performance of the cathode.

Therefore, in order to solve the above problems, coating with a dense protective layer is required, and a highly economical coating method needs to be introduced.

PRIOR ART DOCUMENTS

Patent Documents

Korean Patent Application Laid-Open Publication No. 10-2014-0049804.

DISCLOSURE OF INVENTION

Technical Problem

One embodiment of the present specification provides an interconnect for a solid oxide fuel cell, which comprises a ceramic protective layer having a dense structure.

Another embodiment of the present specification provide a method for manufacturing an interconnect for a solid oxide fuel cell, which has low process costs.

Still another embodiment of the present specification provides a solid oxide fuel cell comprising the interconnect for the solid oxide fuel cell.

Solution to Problem

The present specification provides an interconnect for a solid oxide fuel cell comprising:
  a conductive substrate; and
  a ceramic protective layer provided on one or both sides of the conductive substrate,
  wherein the ceramic protective layer comprises Ni and Co, and the ratio of the atomic percentage (at %) of the Co to the atomic percentage (at %) of the Ni is 1.5 to 9.

The present specification also provides a method for manufacturing an interconnect for a solid oxide fuel cell, comprising: the step of preparing a conductive substrate; and the step of providing a ceramic protective layer on the conductive substrate.

The present specification also provides a solid oxide fuel cell comprising: two or more unit cells; and an interconnect layer provided between the two or more unit cells and comprising an interconnect for the solid oxide fuel cell, wherein each of the unit cells comprises an anode, a cathode, and an electrolyte provided between the anode and the cathode, and the interconnect layer contacts the cathode or anode of each of the unit cells.

Advantageous Effects of Invention

An interconnect for a solid oxide fuel cell according to one embodiment of the present specification has a protective layer having a dense structure by comprising Nickel and Cobalt elements adjusted to a specific ratio, and thus may prevent the cathode from being contaminated with chromium by the evaporation of a chromium (Cr) component generated from the metallic conductive substrate.

One embodiment of the present specification provides a method for manufacturing an interconnect for a solid oxide fuel cell, which has low process costs.

BRIEF DESCRIPTION OF DRAWINGS

FIG. 1 is a sectional view showing an interconnect for a solid oxide fuel cell according to one embodiment of the present specification.

FIGS. 2 and 3 are sectional views of an interconnect according to Example 1.

FIGS. 4 and 5 are SEM photographs of an interconnect according to Example 1.

FIGS. 6 and 7 show XRD measurement data before and after oxidation of an interconnect according to Example 1.

FIGS. 8 and 9 are sectional views of an interconnect according to Comparative Example 4.

FIGS. 10 and 11 are SEM photographs of the surface of an interconnect according to Comparative Example 4.

FIGS. 12 to 16 are sectional views of an interconnect according to Comparative Example 5.

FIG. 17 shows XRD measurement data of an interconnect according to Comparative Example 5.

FIG. 18 shows the results of measuring the area specific resistances (ASR) of interconnects of Example 1 and Comparative Examples 4 and 6 as a function of driving time.

FIG. 19 shows the results of measuring the area specific resistances (ASR) of interconnects of Example 1 and Comparative Example 5 as a function of operating time.

FIG. 20 is an SEM photograph of a section of an interconnect of Example 1 after a solid oxide fuel cell comprising the interconnect was operated at a temperature of 650° C. for 300 hours.

FIG. 21 shows the area specific resistances of interconnects of Examples 2 to 8, measured at 650° C. in an air atmosphere.

FIG. 22 is a schematic view illustrating the principle by which a solid oxide fuel cell (SOFC) generates electricity.

BEST MODE FOR CARRYING OUT THE INVENTION

Hereinafter, the present specification will be described in more detail.

In the present the present specification, "or" means, unless other defined, comprising any or all of those listed, that is, indicates "and/or".

In the present specification, a "layer" means covering 70% or more of an area where the corresponding layer is present. It means covering preferably 75% or more, and more preferably 80% or more.

In the present specification, the "thickness" of any layer means the shortest distance from the lower side to the upper side of the corresponding layer.

In the present specification, 'contact(s)' or 'contacting' means that any one component physically contacts another component, but does not mean that the other component is bound to the entire area of the one component while being in contact therewith. In addition, it means that the majority of the other component is bound to the one component while being in contact therewith, and even if the other component is partially spaced apart from the one component, the spaced portion also faces the corresponding side.

In the present specification, "comprise" or "comprising" means that other elements may further be included.

The present specification provides an interconnect for a solid oxide fuel cell, comprising:
a conductive substrate; and
a ceramic protective layer provided on one or both sides of the conductive substrate,
wherein the ceramic protective layer comprises Ni and Co, and the ratio of the atomic percentage (at %) of the Co to the atomic percentage (at %) of the Ni in the ceramic protective layer is 1.5 to 9.

In the present specification, the "ceramic protective layer" is a component that may be provided on one or both sides of a conductive substrate which is used as an interconnect for a solid oxide fuel cell. The ceramic protective layer of the present specification has the advantage of having excellent electrical conductivity characteristics while effectively protecting the conductive substrate. FIG. 1 illustrates an interconnect for a solid oxide fuel cell, which comprises a ceramic protective layer 2 formed on one side of a conductive substrate 1.

In the present specification, the ceramic protective layer of the interconnect for a solid oxide fuel cell comprises both Nickel (Ni) and Cobalt (Co) elements whose contents were adjusted to a specific ratio. Thus, the ceramic protective layer has a denser structure than a protective layer comprising no Nickel and a protective layer comprising no Cobalt, and has the effect of reducing the area specific resistance of the interconnect.

In one embodiment of the present specification, the ceramic protective layer may be provided on one or both sides of the conductive substrate, and may preferably be provided on a side opposite to a side of the conductive substrate, which contacts the electrode.

In one embodiment of the present specification, the ceramic protective layer may comprises both an Ni element and a Co element.

Since the ceramic protective layer comprises an Ni element and a Co element, it has excellent adhesion to the conductive substrate even at high temperature in an oxidation process, and thus an oxide layer is not delaminated. As a result, the low electrical resistance of the interconnect may be maintained. However, when a ceramic protective layer comprises only a Co element without comprising an Ni element, a problem arises in that the ceramic protective layer has poor adhesion to the conductive substrate in a high-temperature oxidation process, and thus the ceramic protective layer is delaminated from the conductive substrate. This causes a problem in that electrical resistance increases rapidly in the oxidation process.

In one embodiment of the present specification, the ratio of the atomic percentage (at %) of Co to the atomic percentage (at %) of Ni in the ceramic protective layer may be 1.5 to 9, preferably 1.5 to 6, and more preferably 3 to 5.

When the ratio of the atomic percentage (at %) of the Co to the atomic percentage (at %) of the Ni is as described above, the protective layer formed has a dense structure, and has excellent adhesion to the conductive substrate even at high temperature in an oxidation process, and thus an oxide layer is not delaminated. For this reason, the low electrical resistance of the interconnect may be maintained even in long-term operation, and thus the high electrical conductivity of the interconnect may be maintained, and it can effectively prevent a chromium (Cr) component from evaporating from the conductive substrate.

In one embodiment of the present specification, the ratio of the atomic percentage (at %) of the Co to the atomic percentage (at %) of the Ni may be measured by a method which is generally used by those skilled in the art. For example, it may be measured by an energy dispersive spectrometer (EDS).

Alternatively, it may be measured using a scanning electron microscope (e.g., field-effect scanning electron microscope (FE-SEM)) after polishing the section of a protective layer sample. Specifically, for measurement of the ratio, area scan was performed at an accelerating voltage set to more than 15 kV and at a working distance set to about 15 mm in point analysis mode, and the spectral acquisition time was set to no less than 100 seconds in order to minimize noise while increasing sensitivity.

In the present specification, "the ratio of the atomic percentage (at %) of Co to the atomic percentage (at %) of Ni" may not only mean the ratio of the at % of Co to the at % of Ni at any one point of the ceramic protective layer, but also mean the average value of the ratios of the at % of Co to the at % of Ni, measured at two or more points of the ceramic protective layer. For example, when the at % of Ni and the at % of Co are 38.17% and 61.83%, respectively, as measured at one point of the ceramic protective layer, the ratio of the at % of Co to the at % of Ni may be 1.62.

In addition, the ratio of the elements may be adjusted by changing the composition of an electroplating solution which is used for formation of the ceramic protective layer. Specifically, it may be achieved by adjusting the ratio of a source powder of Cobalt and a source powder of Nickel, which are used for the ceramic protective layer.

In one embodiment of the present specification, the ceramic protective layer comprises a spinel structure oxide represented by Formula 1 below:

$$AB_2O_4 \quad \text{[Formula 1]}$$

in Formula 1,

A represents one or two or more elements selected from the group comprising Mg, Fe, Ni, Mn, Cr and Zn; and B represents one or two or more elements selected from the group comprising Al, Co, Fe, Cr and Mn.

In the present specification, the spinel structure means a perfect tetrahedral structure having a cubic structure and four oxygen ions at one position in the cubic structure.

Since the ceramic protective layer comprises the spinel structure oxide, it has an advantage in that it is denser than a ceramic protective layer comprising a perovskite structure oxide, and thus can effectively suppress the evaporation of chromium.

In one embodiment of the present specification, the ceramic protective layer comprises a spinel structure oxide represented by Formula 2 below:

$$Ni_aA'_{1-a}Co_bB'_{2-b}O_4 \quad \text{[Formula 2]}$$

in Formula 2, $A^1$ is selected from the group comprising Mg, Fe, Mn, Cr and Zn;

$B^1$ is selected from the group comprising Al, Fe, Cr and Mn;

$0 < a \leq 1$; and $0 < b \leq 2$.

When Nickel (Ni) and Cobalt (Co), which are included in the ceramic protective layer, are present as an oxide as represented by Formula 2 above, they are effective in that they have excellent high-temperature durability compared to when they are present as a Nickel-Cobalt alloy. Specifically, since an environment in which the ceramic protective layer is used is an oxidative atmosphere having a temperature of 600° C. or higher, the metals may be easily oxidized in this operating environment. Thus, when the metals are present as a Nickel-Cobalt alloy, problems arise in that the metals are oxidized to increase their thermal expansion rates in a high-temperature oxidative atmosphere, and thermal mismatch with adjacent materials occurs, leading to potential delamination of the interface. However, when Nickel and Cobalt are present as a previously prepared oxide, there is an advantage in that the metals are no longer separately oxidized, and thus the above-described problems may be prevented from arising.

In one embodiment of the present specification, the ceramic protective layer comprises a Nickel-Cobalt-based spinel structure oxide ($NiCo_2O_4$). The $NiCo_2O_4$ has an advantage in that a layer comprising the $NiCo_2O_4$ is denser than a layer comprising other spinel structure oxide, and thus may effectively suppress the contamination of the cathode with a chromium component. In addition, the Nickel-Cobalt-based spinel structure oxide ($NiCo_2O_4$) has an advantage in that it is suitable for electroplating as described below compared to a conventional Manganese-Cobalt (Mn, Co)-based spinel structure oxide comprising no Nickel element.

In one embodiment of the present specification, the ceramic protective layer further comprises one or two or more Cobalt-based oxides selected from the group comprising $Co_3O_4$, $CoCr_2O_4$ and $CoFe_2O_4$. The "Cobalt-based oxides" means that ions, such as Cr or Fe ions, diffused from the conductive substrate, react with a spinel phase comprising Cobalt, thereby forming a mixed spinel phase.

In one embodiment of the present specification, the thickness of the ceramic protective layer may be 5 cm to 20 cm, preferably 8 cm to 16 cm, and more preferably 10 cm to 15 cm. When the thickness of the ceramic protective layer is as described above, there is a process advantage in that delamination is prevented from occurring during formation of the ceramic protective layer, and there is also an advantage in that the ceramic protective layer prevents electrical resistance from increasing while the ceramic protective layer is highly dense, and thus the electrical conductivity of the interconnect may be maintained at a high level.

The conductive substrate is not limited and may be any substrate having high electron conductivity while having low ion conductivity. Examples of the conductive substrate generally comprises a ceramic substrate, such as $LaCrO_3$, or a metallic substrate, and preferred examples thereof comprise a metallic substrate.

In one embodiment of the present specification, the conductive substrate may be a ferritic stainless steel (FSS) substrate. When the ferritic stainless steel substrate is used as the conductive substrate, there are advantages in that it shows a uniform stack temperature distribution due to its excellent thermal conductivity, may reduce thermal stress in a planar stack, and has excellent mechanical strength and electrical conductivity.

In one embodiment of the present specification, preferred examples of the ferritic stainless steel comprise, but are not limited to, Crofer 22 (manufactured by ThyssenKrupp), STS441 (manufactured by POSCO), STS430 (manufactured by POSCO), Crofer 22 APU (manufactured by ThyssenKrupp), and the like.

In one embodiment of the present specification, the electrical conductivity of the conductive substrate may be $10^4$ S/cm or higher at 650° C., preferably $10^5$ S/cm or higher at 650° C., and more preferably $10^6$ S/cm or higher at 650° C. Since the electrical conductivity of the conductive substrate is preferably as high as possible, the upper limit thereof is not particularly limited. When the electrical conductivity of the conductive substrate is in the above-described range, an interconnect comprising the conductive substrate has excellent performance.

In one embodiment of the present specification, the thickness of the conductive substrate may be no less than 0.1 mm and no more than 30 mm, no less than 1 mm and no more than 10 mm, no less than 1 mm and no more than 3 mm, or no less than 1.5 mm and no more than 2.5 mm. When this numerical value range is satisfied, there is an advantage in that the conductive substrate has excellent mechanical strength.

In one embodiment of the present specification, the area specific resistance (ASR) of the ceramic protective layer in an air atmosphere at 650° C. may be 0.05 $\Omega \cdot cm^{-2}$ or less, preferably 0.03 $\Omega \cdot cm^{-2}$ or less, and more preferably 0.02 $\Omega \cdot cm^{-2}$ or less. When this numerical value range is satisfied, there is an advantage in that an interconnect for a solid oxide fuel cell comprises a ceramic protective layer having low resistance, excellent cell performance may be maintained when the interconnect is applied to a solid oxide fuel cell.

The present specification provides a method for manufacturing the above-described interconnect for a solid oxide fuel cell, comprising:

the step of preparing a conductive substrate; and the step of providing a ceramic protective layer on the conductive substrate.

In one embodiment of the present specification, the step of preparing of the conductive substrate may further comprises the step of sand-blasting the conductive substrate with metallic particles.

The sand-blasting is a method of polishing the surface of the conductive substrate with an abrasive such as metallic particles or metal oxide particles by means of compressed air.

When the surface of the conductive substrate is polished by sand-blasting, there are advantages in that uniform roughness may be imparted to the surface of the conductive substrate, and when forming the ceramic protective layer on the conductive substrate by electroplating, the adhesion of the ceramic protective layer to the conductive substrate may be increased. This may prevent the ceramic protective layer from being easily delaminated.

In one embodiment of the present specification, the compressed air may be air compressed by a method which is generally used in the art.

In one embodiment of the present specification, the metallic particles may be made of one or more selected from the group consisting of SiC, $B_4C$, $CeO_2$, $SiO_2$, and $Al_2O_3$, and may preferably be metal oxide particles having excellent strength, such as $Al_2O_3$ particles. For example, the metallic particles may be $Al_2O_3$ particles having a size of #80 mesh.

In one embodiment of the present specification, the step of providing of the ceramic protective layer may be performed by electroplating, and may further comprises the step of oxidizing the conductive substrate having the ceramic protective layer provided thereon.

The electroplating is a method of coating the surface of a metal with a thin layer of other metal according to the principle of electrolysis. In this method, ceramic powder comprising metal ions to be coated is dispersed in a solvent, thereby preparing a coating solution, after which a previously prepared substrate is connected to electrodes, and the coating solution is coated on the substrate by application of a voltage.

When the ceramic protective layer is provided by the electroplating method, there are advantages in that the process cost is lower compared to when a protective layer is coated on a substrate by spraying a conventional coating solution, and in that it is possible to form a protective layer having a uniform thickness. The electroplating method has another advantage over the conventional spray process in that step coverage is excellent, making it possible to uniformly coat the interconnect surface having complex shapes, comprising irregularities. In addition, the electroplating method is effective in that the yield increases, unlike the spray process in which excess powder remains after deposition.

In one embodiment of the present specification, the step of providing of the ceramic protective layer by electroplating may comprises the step of immersing the conductive substrate in an electroplating solution and performing electroplating using the conductive substrate as a working electrode.

In one embodiment of the present specification, the electroplating solution may comprises ceramic powder and a solvent.

In one embodiment of the present specification, the ceramic powder may comprise one or more selected from the group consisting of $CoSO_4 \cdot 7H_2O$, $CoCl_2 \cdot 6H_2O$, $NiSO_4 \cdot 6H_2O$ and $NiCl_2 \cdot 6H_2O$.

In one embodiment of the present specification, the solvent may be boric acid ($H_3BO_3$).

In one embodiment of the present specification, the step of oxidizing of the conductive substrate having the ceramic protective layer provided thereon may further comprises heat-treating the conductive substrate at a temperature of 600° C. to 800° C. for 1 to 10 hours.

In one embodiment of the present specification, the step of oxidizing of the conductive substrate may preferably be performed at a temperature ranging from 650° C. to 800° C., more preferably from 700° C. to 800° C.

When the numerical range of the heat-treatment temperature is as described above, the electrical conductivity of the interconnect may be maintained at a high level by preventing a large amount of an interfacial oxide from occurring between the ceramic protective layer and the conductive substrate, and it is possible to prevent the problem that phase deformation of the conductive substrate itself may occur.

In one embodiment of the present specification, the step of oxidizing of the conductive substrate may preferably be performed for a time ranging from 1 hour to 10 hours, preferably from 2 hours to 8 hours, more preferably from 2 hours to 3 hours.

When the numerical range of the heat-treatment time is as described above, the oxidation reaction sufficiently occurs, and thus the ceramic protective layer is highly dense. In addition, in this case, the electrical conductivity of the interconnect may be maintained at a high level by preventing a large amount of an interfacial oxide from occurring between the ceramic protective layer and the conductive substrate, and it is possible to prevent the problem that phase deformation of the conductive substrate itself may occur.

The present specification also provides a solid oxide fuel cell comprising: two or more unit cells; and an interconnect layer provided between the two or more unit cells and comprising the above-described interconnect for the fuel oxide fuel cell, wherein each of the unit cells comprises an anode, a cathode, and an electrolyte provided between the anode and the cathode, and the interconnect layer contacts the cathode or anode of each of the unit cells.

In one embodiment of the present specification, the unit cell is the most fundamental unit of the solid oxide fuel cell, and comprises an anode, a cathode, and an electrolyte provided between the anode and the cathode.

In one embodiment of the present specification, the anode may comprises an inorganic material having oxygen ion conductivity.

Although the kind of inorganic material is not particularly limited, the inorganic material may comprise one or two or more selected from among yttria-stabilized zirconia (YSZ; $(Y_2O_3)_x(ZrO_2)_{1-x}$, x=0.05 to 0.15), scandia-stabilized zirconia (ScSZ; $(Sc_2O_3)_x(ZrO_2)_{1-x}$, x=0.05 to 0.15), samarium-doped ceria (SDC; $(Sm_2O_3)(CeO_2)_{1-x}$, x=0.02 to 0.4), and gadolinium-doped ceria (GDC; $(Gd_2O_3)_x(CeO_2)_{1-x}$, x=0.02 to 0.4).

In one embodiment of the present specification, the thickness of the anode may be no less than 10 μm and no more than 1,000 µm. Specifically, the thickness of the fuel cell may be no less than 100 µm and no more than 800 µm.

In one embodiment of the present specification, the porosity of the anode may be no less than 10% and no more than 50%. Specifically, the porosity of the anode may be no less than 10% and no more than 30%.

In one embodiment of the present specification, the pore diameter of the anode may be no less than 0.1 µm and no more than 10 µm, no less than 0.5 µm and no more than m, or no less than 0.5 m and no more than 2 m.

In one embodiment of the present specification, although a method for manufacturing the anode is not particularly limited, the anode may be manufactured, for example, either by coating an anode slurry, followed by drying and sintering, or by coating and drying an anode slurry on separate release paper, thereby preparing anode green sheets, and calcining one or more anode green sheets alone or together with green sheets of adjacent layers.

In one embodiment of the present specification, the thickness of the anode green sheet may be no less than 10 m and no more than 500 m.

In one embodiment of the present specification, the anode slurry may comprises inorganic particles having oxygen ion conductivity. If necessary, the anode slurry may further comprises at least one selected from among a binder resin, a plasticizer, a dispersing agent and a solvent. The binder resin, the plasticizer, the dispersing agent and the solvent are not particularly limited, and may each comprises a conventional material known in the art.

In one embodiment of the present specification, based on the total weight of the anode slurry, the content of the inorganic particles having oxygen ion conductivity may be no less than 10 wt % and no more than 70 wt %; the content of the solvent may be no less than 10 wt % and no more than 30 wt %; the content of the dispersing agent may be no less than 5 wt % and no more than 10 wt %; the content of the plasticizer may be no less than 0.5 wt % and no more than 3 wt %; and the content of the binder resin may be no less than 10 wt % and no more than 30 wt %.

In one embodiment of the present specification, the anode slurry may further comprises NiO. The volume ratio of the inorganic particles having oxygen ion conductivity to NiO may be 1:3 to 3:1 vol %.

In one embodiment of the present specification, the anode slurry may further comprises Carbon Black. The content of the Carbon Black may be no less than 1 wt % and no more than 20 wt % based on the total weight of the anode slurry.

In one embodiment of the present specification, the anode may be provided on a separate porous ceramic support or porous metallic support, or may comprises an anode support and an anode functional layer. In this regard, the anode support is a layer that comprises the same inorganic material as that of the anode functional layer, but has a higher porosity and a thicker thickness compared to those of the anode functional layer, and thus serves to support other layers, and the anode functional layer is a layer provided between the anode support and the electrolyte layer and serves mainly as an actual anode.

In one embodiment of the present specification, when the anode is provided on a porous ceramic support or a porous metallic support, the anode may be manufactured by laminating a prepared anode green sheet on a calcined porous ceramic support or porous metallic support, followed by calcination.

In one embodiment of the present specification, when the anode comprises the anode support and the anode functional layer, the anode may be manufactured by laminating a prepared green sheet for the anode functional layer on a calcined anode support, followed by calcination.

In one embodiment of the present specification, the anode support may comprises YSZ, NiO, and Carbon Black.

In one embodiment of the present specification, the anode functional layer may comprises YSZ and NiO.

In one embodiment of the present specification, when the anode comprises the anode support and the anode functional layer, the thickness of the anode support may be no less than 350 µm and no more than 1,000 µm, and the thickness of the anode functional layer may be no less than 5 µm and no more than 50 µm.

In one embodiment of the present specification, the cathode is not particularly limited and may be any material which is highly stable in an oxidative atmosphere and has high ion conductivity and high electron conductivity. For example, it may comprises LSCF ($La_{0.6}Sr_{0.4}Co_{0.2}Fe_{0.8}O_{3-\delta}$).

In one embodiment of the present specification, the electrolyte may comprises an inorganic material having oxygen ion conductivity, and the inorganic material is not particularly limited and may be any material having oxygen ion conductivity. Specifically, the inorganic material of the electrolyte, which has oxygen ion conductivity, may comprises a composite metal oxide comprising one or more selected from the group consisting of zirconium oxide-based, cerium oxide-based, lanthanum oxide-based, titanium oxide-based and bismuth oxide-based materials. More specifically, the inorganic material of the electrolyte, which has oxygen ion conductivity, may comprises one or two or more selected from among yttria-stabilized zirconia (YSZ; $(Y_2O_3)_x(ZrO_2)_{1-x}$, x=0.05 to 0.15), scandia-stabilized zirconia (ScSZ; $(Sc_2O_3)_x(ZrO_2)_{1-x}$, x=0.05 to 0.15), samarium-doped ceria (SDC; $(Sm_2O_3)(CeO_2)_{1-x}$, x=0.02 to 0.4), and gadolinium-doped ceria (GDC; $(Gd_2O_3)_x(CeO_2)_{1-x}$, x=0.02 to 0.4).

In one embodiment of the present specification, the thickness of the electrolyte may be no less than 10 µm and no more than 100 µm. Specifically, the thickness of the electrolyte may be no less than 20 µm and no more than 50 µm.

In one embodiment of the present specification, although a method for manufacturing the electrolyte is not particularly limited, the electrolyte may be manufactured, for example, either by coating an electrolyte slurry, followed by drying and sintering, or by coating and drying an electrolyte slurry on separate release paper, thereby preparing an electrolyte green sheet, and calcining the electrolyte green sheet alone or together with green sheets of adjacent layers.

In one embodiment of the present specification, the thickness of the electrolyte green sheet may be no less than 10 µm and no more than 100 µm.

In one embodiment of the present specification, the electrolyte slurry may comprises inorganic particles having oxygen ion conductivity. If necessary, the electrolyte slurry may further comprises at least one selected from among a binder resin, a plasticizer, a dispersing agent and a solvent. The binder resin, the plasticizer, the dispersing agent and the solvent are not particularly limited, and may each comprises a conventional material known in the art.

In one embodiment of the present specification, based on the total weight of the electrolyte slurry, the content of the inorganic particles having oxygen ion conductivity may be no less than 10 wt % and no more than 70 wt %; the content of the solvent may be no less than 10 wt % and no more than 30 wt %; the content of the dispersing agent may be no less than 5 wt % and no more than 10 wt %; the content of the plasticizer may be no less than 0.5 wt % and no more than 3 wt %; and the content of the binder resin may be no less than 10 wt % and no more than 30 wt %.

In one embodiment of the present specification, the electrolyte may have a bi-layer structure. The bi-layer structure may comprises a lower electrolyte layer (E1) and an upper electrolyte layer (E2). The lower electrolyte layer (E1) is an electrolyte layer provided on the anode side in the solid oxide fuel cell, and the upper electrolyte layer (E2) is an electrolyte layer provided on the cathode side.

In one embodiment of the present specification, the inorganic material having oxygen ion conductivity, which is included in the anode and the electrolyte, may have an oxygen ion conductivity of 0.01 S/cm or higher at 650° C. Since the oxygen ion conductivity of the inorganic particles is preferably as high as possible, the upper limit of the oxygen ion conductivity of the inorganic particles is not particularly limited.

In the present specification, the "green sheet" refers to a film-type sheet which is not a complete final product, but may be processed in a subsequent step. In other words, the green sheet is one obtained by applying a coating composition comprising inorganic particles and a solvent, followed by drying into a sheet form. The green sheet refers to a semi-dried sheet which may maintain its sheet form while comprising a slight amount of a solvent.

In one embodiment of the present specification, the shape of the fuel cell is not limited, and may be, for example, a coin shape, a flat plate shape, a cylindrical shape, a conical shape, a button shape, a sheet shape, or a laminated shape.

In one embodiment of the present specification, the unit cell may further comprises a sealing material.

The sealing material is not particularly limited and may be any material which has a thermal expansion coefficient similar to those of the anode, cathode and interconnect of the unit cells and which may provide sealing between components. Examples of the sealing material comprises silica, alkali or alkaline rare earth oxides, and the like.

In one embodiment of the present specification, the interconnect for the solid oxide fuel cell connect the plurality of unit cells in series.

In one embodiment of the present specification, the interconnect of the unit cell at position of "m" among the plurality of unit cells connects the cathode at position of "m" to the anode at position of "m+1" in series. In this regard, m is an integer of 1 or greater.

MODE FOR THE INVENTION

Hereinafter, the present disclosure will be described in more detail with reference to examples. However, these examples are intended to describe the present disclosure in more detail, and it will be obvious to those skilled in the art that the scope of the present specification is not limited by these examples.

Example 1—Interconnect Having Ni—Co-Based Ceramic Protective Layer Formed on Substrate 1) Preparation of Conductive Substrate As a conductive substrate, a ferritic stainless steel (FSS)-based STS-441 substrate was prepared and processed into a size of 5 cm×5 cm, after which the front side thereof was sand-blasted with $Al_2O_3$ particles having a size of #80 mesh. The sandblasted conductive substrate was washed with acetone or ethanol, and then impurities remaining on the substrate surface were removed by an electro-cleaning process in alkaline and acidic solutions. Next, the conductive substrate was dried under atmospheric conditions at room temperature (25° C.).

2) Preparation of Electroplating Solution

As materials for a ceramic protective layer, Cobalt sulfate ($CoSO_4 \cdot 7H_2O$) powder was used as a source powder of Cobalt (Co), and $NiSO_4 \cdot 6H_2O$ or $NiCl_2 \cdot 6H_2O$ was used as a source powder of Nickel (Ni). These powders were dissolved in a boric acid ($H_3BO_3$) solvent, thereby preparing an electroplating solution. Then, the electroplating solution was heated to 50° C.

3) Formation of Ceramic Protective Layer

The conductive stainless steel (STS441) substrate prepared as described above was used as a working electrode. The substrate was immersed in the electroplating solution prepared as described above, after which a predetermined current and a predetermined voltage were applied using an Ni plate as a counter electrode, thereby forming a ceramic protective layer on the conductive substrate. The electroplating time was about 1 hour, and the ceramic protective layer formed had a thickness of 10 μm to 15 μm.

4) Oxidation Process

The interconnect having the ceramic protective layer formed on the conductive substrate was oxidized at a temperature of 600° C. under an air atmosphere for 1,000 hours, thereby manufacturing a final interconnect.

5) Observation of Section of Interconnect

FIGS. 2 and 3 are sectional views of the interconnect manufactured as described above. As can be seen therein, an Ni—Co ceramic protective layer was formed on one side of the conductive substrate (STS 441).

FIGS. 4 and 5 are SEM photographs of the surface of the interconnect. As can be seen therein, the Ni—Co ceramic protective layer was dense and uniform.

6) Analysis of Components of Interconnect

Using energy dispersive spectroscopy (EDS) analysis, the atomic percentages (at %) of a Nickel element (Ni) and a Cobalt element (Co) at three random points on the ceramic protective layer of the interconnect were measured, and the results are shown in Table 1 below.

TABLE 1

|  | Point 1 (at %) | Point 2 (at %) | Point 3 (at %) | Average (at %) |
| --- | --- | --- | --- | --- |
| Ni | 38.17 | 38.33 | 38.56 | 38.35 |
| Co | 61.83 | 61.67 | 61.44 | 61.645 |
| Ratio of at % of Co to at % of Ni | 1.62 | 1.61 | 1.59 | 1.61 |

As can be seen in Table 1 above, the average ratio of the at % of the Co element to the at % of the Ni element in the ceramic protective layer of the finally manufactured interconnect was 1.6.

7) Analysis of Oxide Component of Interconnect

For the interconnect, X-ray diffraction (XRD) analysis was performed immediately after forming the protective layer on the STS-441 substrate (FIG. 6) and after oxidizing the protective layer in air at 600° C. for 1,000 hours (FIG. 7), and the results are shown in the respective figures.

After 1,000 hours of oxidation at 600° C., a Co oxide ($Co_3O_4$), an Ni oxide (NiO) and an Ni/Co oxide ($NiCo_2O_4$ phase) were observed, and a spinel phase having $CoFe_2O_4$ comprising a slight amount of Fe appeared.

Namely, it can be seen that ions, such as Cr or Fe ions, diffused from the STS-441 substrate after high-temperature oxidation, reacted with a spinel phase of $Co_3O_4$, thereby forming a mixed spinel phase.

Example 2

An interconnect was manufactured in the same manner as described in Example 1, except that the average ratio of the at % of the Co element to the at % of the Ni element in the ceramic protective layer of the finally manufactured interconnect was 2.

Example 3

An interconnect was manufactured in the same manner as described in Example 1, except that the average ratio of the at % of the Co element to the at % of the Ni element in the ceramic protective layer of the finally manufactured interconnect was 3.

Example 4

An interconnect was manufactured in the same manner as described in Example 1, except that the average ratio of the at % of the Co element to the at % of the Ni element in the ceramic protective layer of the finally manufactured interconnect was 3.5.

Example 5

An interconnect was manufactured in the same manner as described in Example 1, except that the average ratio of the at % of the Co element to the at % of the Ni element in the ceramic protective layer of the finally manufactured interconnect was 4.

Example 6

An interconnect was manufactured in the same manner as described in Example 1, except that the average ratio of the at % of the Co element to the at % of the Ni element in the ceramic protective layer of the finally manufactured interconnect was 5.

Example 7

An interconnect was manufactured in the same manner as described in Example 1, except that the average ratio of the at % of the Co element to the at % of the Ni element in the ceramic protective layer of the finally manufactured interconnect was 7.

Example 8

An interconnect was manufactured in the same manner as described in Example 1, except that the average ratio of the at % of the Co element to the at % of the Ni element in the ceramic protective layer of the finally manufactured interconnect was 9.

Comparative Example 1

An interconnect was manufactured in the same manner as described in Example 1, except that the average ratio of the at % of the Co element to the at % of the Ni element in the ceramic protective layer of the finally manufactured interconnect was 0.08.

Comparative Example 2

An interconnect was manufactured in the same manner as described in Example 1, except that the ratio of the at % of the Co element to the at % of the Ni element in the ceramic protective layer of the finally manufactured interconnect was 0.41 on average.

Comparative Example 3

An interconnect was manufactured in the same manner as described in Example 1, except that the average ratio of the at % of the Co element to the at % of the Ni element in the ceramic protective layer of the finally manufactured interconnect was 0.97 on average.

The average ratios of the at % of the Co element to the at % of the Ni element in the ceramic protective layers of Examples 1 to 8 and Comparative Examples 1 to 3 are shown in Table 2 below.

TABLE 2

| | Examples | | | | | | | | Comparative Examples | | |
|---|---|---|---|---|---|---|---|---|---|---|---|
| | 1 | 2 | 3 | 4 | 5 | 6 | 7 | 8 | 1 | 2 | 3 |
| Ratio of at % of Co/Ni | 1.6 | 2 | 3 | 3.5 | 4 | 5 | 7 | 9 | 0.08 | 0.41 | 0.97 |

Comparative Example 4—Interconnect Having Mn—Co Based Ceramic Protective Layer Formed on Substrate 1) Preparation of Conductive Substrate A conductive substrate was prepared in the same manner as described in Example 1 above.

2) Formation of Ceramic Protective Layer

Using a conventional atmospheric plasma spray technique, a ceramic protective layer comprising Mn and Co was formed on an STS-441 substrate.

Specifically, an $Mn_{1.5}Co_{1.5}O_4$ oxide was synthesized by a solid-state reaction, and then granulated. In the synthesis, $MnCO_3$ and $Co_3O_4$ were used as raw materials, and these powders were weighed stoichiometrically, wet-mixed by ball milling, dried, and then calcined at a temperature of 900 to 1100° C., thereby preparing the oxide.

Next, the oxide was dispersed again in water to a solid loading of 20% and dried using a spray-drying system, thereby obtaining granules having a diameter of 30 to 50 μm. The granules were introduced into an air plasma spray (APS) system. Argon gas (Ar) and Helium gas (He) were used as a plasma gas, and the power of a plasma jet was set to 16.5-22.5 kW. In addition, during the APS process, the flow rate of a carrier gas was maintained at 50 cc/min, and the nozzle injection angle was maintained at 70-90°. As a result, a protective layer having a thickness of about 30 μm was formed.

3) Observation of Section of Interconnect

FIGS. 8 and 9 are sectional views of the interconnect manufactured as described above. As can be seen therein, an Mn—Co ceramic protective layer was formed on one side of the conductive substrate (STS 441).

FIGS. 10 and 11 are SEM photographs of the surface of the interconnect. As can be seen therein, the Mn—Co ceramic protective layer was less dense than the Ni—Co ceramic protective layer.

4) Analysis of Components of Interconnect

Using EDS analysis, the atomic percentages (at %) of a Manganese (Mn) element and a Cobalt (Co) element at ten random points on the ceramic protective layer of the interconnect manufactured in Comparative Example 4 were measured, and the results are shown in Table 3 below.

As shown in Table 3 below, the ceramic protective layer contained Manganese (Mn) and Cobalt (Co) element and did not comprise the Nickel (Ni) element.

TABLE 3

| at % | Point 1 | Point 2 | Point 3 | Point 4 | Point 5 | Point 6 | Point 7 | Point 8 | Point 9 | Point 10 | average |
|---|---|---|---|---|---|---|---|---|---|---|---|
| Mn | 53.62 | 53.95 | 52.7 | 52.53 | 53.66 | 54.82 | 51.87 | 51.56 | 54.94 | 52.84 | 52.96 |
| Co | 46.38 | 46.05 | 47.30 | 47.47 | 46.34 | 45.18 | 48.13 | 48.44 | 45.06 | 47.16 | 47.03 |

TABLE 4

|  | O | Si | Ti | Cr | Fe | Co |
|---|---|---|---|---|---|---|
| S1 | 53.97 | 0.607 | — | 1.662 | 6.541 | 37.218 |
| S2 | 8.975 | 1.335 | 0.549 | 17.716 | 71.425 | — |

Comparative Example 5—Interconnect Having Co Ceramic Protective Layer Formed on Substrate 1) Preparation of Conductive Substrate A conductive substrate was prepared in the same manner as described in Example 1 above.

2) Preparation of Electroplating Solution

As a material for a ceramic protective layer, Cobalt sulfate ($CoSO_4 \cdot 7H_2O$) powder was used as a source powder of Cobalt (Co). The powder was dissolved in a boric acid ($H_3BO_3$) solvent, thereby preparing an electroplating solution. Then, the electroplating solution was heated to 50° C.

3) Formation of Ceramic Protective Layer

The conductive stainless steel (STS441) substrate prepared as described above was used as a working electrode. The substrate was immersed in the electroplating solution prepared as described above, after which a predetermined current and a predetermined voltage were applied using a Co plate as a counter electrode, thereby finally forming a ceramic protective layer on the conductive substrate, thereby manufacturing an interconnect.

The electroplating time was about 1 hour, and the ceramic protective layer formed had a thickness of 10 μm to 15 μm. Thereafter, the prepared sample was heat-treated at a temperature of 600° C. to 800° C. under an air atmosphere, thereby forming a Cobalt (Co)-based protective layer on the STS-441 substrate, thereby manufacturing an interconnect.

4) Oxidation Process

The interconnect having the ceramic protective layer formed on the conductive substrate was oxidized at a temperature of 600° C. under an air atmosphere for 1,000 hours, thereby manufacturing a final interconnect.

5) Observation of Section of Interconnect

FIGS. 12 to 14 are sectional views of the interconnect manufactured as described above. As can be seen therein, a Co ceramic protective layer was formed on one side of the conductive substrate (STS 441).

6) Analysis of Components of Interconnect

Using energy dispersive spectroscopy (EDS) analysis, the atomic percentages (at %) of each element in the ceramic protective layer (S1) and conductive substrate layer (S2) of the interconnect were measured (FIG. 14), and the results are shown in Table 4 below.

As can be seen in Table 4 below, the ceramic protective layer (Si) of the interconnect contained Co and did not comprise the Nickel (Ni) element.

7) Analysis of Oxide Components of Interconnect

For the interconnect, X-ray diffraction (XRD) analysis was performed after oxidizing the protective layer in air at 600° C. for 1,000 hours, and the results are shown in FIG. 17.

As can be seen therein, CoO, $Co_2O_3$, $Co_3O_4$ and CrO oxides were produced. This suggests that the protective layer of the interconnect manufactured in Comparative Example 5 didn't comprises Nickel (Ni).

Comparative Example 6—Interconnect Having No Ceramic Protective Layer Formed on Substrate Using an STS-441 substrate having no protective layer formed thereon, an interconnect was manufactured.

Test Example 1—Analysis of Area Specific Resistance (ASR)

In order to compare the case in which the protective layer contains both Nickel and Cobalt with other cases, Test Example 1 was performed.

To evaluate electrical properties in an oxidative atmosphere at high temperature, area specific resistance (ASR) was measured using a DC 4-probe technique.

For measurement of ASR, time-dependent changes in resistance in an air atmosphere at a temperature of 600° C. were measured while a predetermined load was applied in a direction perpendicular to the protective layer.

The area specific resistances of the interconnects according to Example 1 and Comparative Examples 4 and 6 were measured, and the results are shown in FIG. 18.

Furthermore, the area specific resistances of the interconnects according to Example 1 and Comparative Example 5 were measured, and the results are shown in FIG. 19.

Referring to FIG. 18, it could be seen that the interconnect according to Example 1 was maintained at low resistance values even during long-term operation. This is because the interconnect of Example 1 contained both Nickel (Ni) and Cobalt (Co) elements, and thus the protective layer was highly dense, thus preventing the formation of an interfacial oxide layer.

However, in the case of the interconnect according to Comparative Example 4, it could be seen that the initial resistance value was high, and thus the resistance value did not decrease even after the passage of time. This is because the interconnect according to Comparative Example 4 contained the Manganese (Mn) element instead of Nickel (Ni), unlike the interconnect of Example 1, and the density of the protective layer was low, and thus an interfacial oxide layer with low electrical conductivity was formed during operation.

In addition, it could be seen that, since the interconnect according to Comparative Example 6 did not comprise the ceramic protective layer, the resistance value thereof increased with the passage of time.

Referring to FIG. 19, it could be seen that the resistance of the interconnect according to Comparative Example 5 increased very rapidly with the passage of time. This is because the Co oxide layer of Comparative Example 5 had low interfacial adhesion to the conductive substrate, unlike the interconnect of Example 1, and thus the Co oxide layer was delaminated. FIGS. 15 and 16 show a section of the interconnect of Comparative Example 5, in which the Co oxide layer was delaminated.

Test Example 2—Analysis of Area Specific Resistance (ASR)

The area specific resistance of the protective layer was analyzed as a function of the atomic percentages (at %) of Nickel and Cobalt contained in the protective layer. Specifically, the area specific resistances of the interconnects of Examples 2 to 8 were measured, and the results are shown in Table 5 below and FIG. 21.

The internal temperature of a furnace used in the measurement was maintained at 650° C., and the measurement was performed in an air atmosphere.

TABLE 5

| | Examples | | | | | | |
|---|---|---|---|---|---|---|---|
| | 2 | 3 | 4 | 5 | 6 | 7 | 8 |
| Ratio of at % of Co/Ni | 2.0 | 3.0 | 3.5 | 4 | 5 | 7 | 9 |
| Area specific resistance (ASR, $\Omega/cm^2$) | 0.022 | 0.007 | 0.014 | 0.014 | 0.009 | 0.028 | 0.028 |

From the results in Table 5 above, it could be seen that the ceramic protective layers of the interconnects according to Examples 2 to 8 had an area specific resistance of 0.05 $\Omega \cdot cm^{-2}$ or lower. In particular, it could be seen that the interconnects of Examples 3 to 6, in which the ratio of the at % of Co/Ni was 3 to 5, had the lowest area-specific resistance which is 0.02 $\Omega \cdot cm^{-2}$ or lower.

Test Example 3—Analysis of Denseness of Protective Layer

In order to compare the structural stability of the ceramic protective layers, the interconnects of Example 1 and Comparative Example 5 were each exposed to high temperature for a predetermined time, and whether the ceramic protective layer would be delaminated was examined. As a result, it could be seen that the ceramic protective layer of the interconnect of Example 1 was not delaminated from the conductive substrate, but the ceramic protective layer of the interconnect of the Comparative Example 5 was delaminated from the conductive substrate.

Specifically, the Ni—Co oxide layer of the interconnect according to Example 1 had excellent interfacial adhesion to the conductive substrate, and thus when the interconnect is applied to a solid oxide fuel cell, the denseness of the protective layer is maintained even during long-term operation. FIGS. 2 and 3 show a section of the interconnect in which the ceramic protective layer was not laminated.

In addition, the interconnect according to Example 1 applied to a solid oxide fuel cell which was then operated at a temperature of 650° C. for 300 hours. In this case, it could be seen that a chromia layer, produced from a chromium gas volatilized from the conductive substrate, was formed under the Ni—Co oxide layer. This can be seen in FIG. 20. This suggests that when the interconnect having the dense protective layer structure is applied to a solid oxide fuel cell, it has the effect of catching a chromium gas even when the solid oxide fuel cell is operated for a long period of time, thereby preventing the chromium gas from flowing upward.

On the contrary, as shown in FIGS. 15 and 16, when the interconnect of Comparative Example 5, which contained no Nickel, was heat-treated at a temperature of 800° C. for 2 hours, the Cobalt oxide layer was delaminated from the conductive substrate.

The invention claimed is:

1. An interconnect for a solid oxide fuel cell, comprising:
   a conductive substrate having a first and a second surface; and
   a ceramic protective layer present on one or both of the first and the second surface of the conductive substrate,
   wherein the ceramic protective layer comprises a spinel structure oxide represented by Formula 2 below:

$Ni_aA'_{1-a}Co_bB'_{2-b}O_4$ [Formula 2]

wherein in Formula 2, A' is one or more element selected from the group consisting of Mg, Fe, Mn, Cr and Zn; B' is one or more element selected from the group consisting of Al, Fe, Cr and Mn; 0<a<1; and 0<b<2;
   wherein the ceramic protective layer further comprises one or more cobalt-based oxide selected from the group consisting of $Co_3O_4$, $CoCr_2O_4$ and $CoFe_2O_4$,
   wherein an average value of a ratio of an atomic percentage (at %) of the Co to an atomic percentage (at %) of the Ni in the ceramic protective layer is 3 to 5, measured at two or more points of the ceramic protective layer,
   wherein the ceramic protective layer has an area specific resistance (ASR) analyzed as a function of the atomic percentage of Ni and Co of 0.05 $\Omega \cdot cm^{-2}$ or less as measured in an air atmosphere at 650° C., and
   wherein the ceramic protective layer has a thickness ranging from 5 µm to 20 µm.

2. The interconnect for the solid oxide fuel cell according to claim 1, wherein the ceramic protective layer further comprises a spinel structure oxide represented by Formula 1 below:

$AB_2O_4$ [Formula 1]

wherein in Formula 1,
   A represents one or more element selected from the group consisting of Mg, Fe, Ni, Mn, Cr and Zn; and
   B represents one or more element selected from the group consisting of Al, Co, Fe, Cr and Mn.

3. The interconnect for the solid oxide fuel cell according to claim 1, wherein the conductive substrate comprises a ferritic stainless steel (FSS) substrate.

4. A method for manufacturing the interconnect for the solid oxide fuel cell according to claim 1, comprising:
   a step of preparing a conductive substrate; and
   a step of providing a ceramic protective layer on the conductive substrate.

5. The method for manufacturing the interconnect for the solid oxide fuel cell of claim 4, wherein the step of preparing of the conductive substrate further comprises sand-blasting the conductive substrate with metallic particles.

6. The method for manufacturing the interconnect for the solid oxide fuel cell of claim 4, wherein the step of providing of the ceramic protective layer is performed by electroplating, and further comprises a step of oxidizing the conductive substrate having the ceramic protective layer provided thereon.

7. The method for manufacturing the interconnect for the solid oxide fuel cell of claim 6, wherein the step of oxidizing of the conductive substrate having the ceramic protective layer provided thereon comprises heat-treating the conductive substrate having the ceramic protective layer provided thereon at 600° C. to 800° C. for 1 hour to 10 hours.

8. A solid oxide fuel cell comprising:
two or more unit cells; and
an interconnect layer provided between the two or more unit cells and comprising the interconnect for the solid oxide fuel cell according to claim 1,
wherein each of the unit cells comprises an anode, a cathode, and an electrolyte provided between the anode and the cathode, and
the interconnect layer contacts the cathode or anode of each of the unit cells.

9. The interconnect for the solid oxide fuel cell according to claim 1, wherein the ceramic protective layer has an area specific resistance (ASR) analyzed as a function of the atomic percentage of Ni and Co of 0.03 $\Omega\#cm^{-2}$ or less as measured in an air atmosphere at 650° C.

10. The interconnect for the solid oxide fuel cell according to claim 2, wherein the spinel structure oxide represented by Formula 1 is $NiCo_2O_4$.

11. The interconnect for the solid oxide fuel cell according to claim 1, wherein the ceramic protective layer has a thickness ranging from 8 μm to 16 μm.

12. The interconnect for the solid oxide fuel cell according to claim 1, wherein the ceramic protective layer has a thickness ranging from 10 μm to 15 μm.

* * * * *